(12) United States Patent
Harada et al.

(10) Patent No.: US 10,138,762 B2
(45) Date of Patent: *Nov. 27, 2018

(54) POWER GENERATION SYSTEM

(71) Applicant: KYUSHU ELECTRIC POWER CO., INC., Fukuoka-shi (JP)

(72) Inventors: Tatsuro Harada, Fukuoka (JP); Seiichiro Matsuda, Fukuoka (JP); Isao Mochida, Fukuoka (JP); Jun-ichiro Hayashi, Fukuoka (JP); Yohsuke Matsushita, Fukuoka (JP); Tsuyoshi Yamamoto, Fukuoka (JP)

(73) Assignee: KYUSHU ELECTRIC POWER CO., INC., Fukuoka-shi (JP)

( * ) Notice: Subject to any disclaimer, the term of this patent is extended or adjusted under 35 U.S.C. 154(b) by 681 days.

This patent is subject to a terminal disclaimer.

(21) Appl. No.: 14/425,912

(22) PCT Filed: Sep. 13, 2013

(86) PCT No.: PCT/JP2013/074825
§ 371 (c)(1),
(2) Date: Mar. 4, 2015

(87) PCT Pub. No.: WO2014/042240
PCT Pub. Date: Mar. 20, 2014

(65) Prior Publication Data
US 2015/0218971 A1    Aug. 6, 2015

(30) Foreign Application Priority Data

Sep. 14, 2012  (JP) ................................ 2012-203637

(51) Int. Cl.
*F01K 17/06*     (2006.01)
*C10B 3/02*      (2006.01)
(Continued)

(52) U.S. Cl.
CPC ................ *F01K 17/06* (2013.01); *C10B 3/02* (2013.01); *C10B 31/02* (2013.01); *C10B 47/20* (2013.01);
(Continued)

(58) Field of Classification Search
CPC ....................................................... C10B 57/10
See application file for complete search history.

(56) References Cited

U.S. PATENT DOCUMENTS 2,658,743 A * 11/1953 Speil ......................... C03B 3/02
                                                                    414/162
5,554,201 A    9/1996 Yagaki et al.
(Continued)

FOREIGN PATENT DOCUMENTS

JP    54-061205    5/1979
JP    62-62892     3/1987
(Continued)

OTHER PUBLICATIONS

International Search Report dated Dec. 17, 2013 in PCT/JP13/074825 Filed Sep. 13, 2013.

*Primary Examiner* — Kathryn Wright
(74) *Attorney, Agent, or Firm* — Oblon, McClelland, Maier & Neustadt, L.L.P.

(57) ABSTRACT

A power generation system in which the combustion heat of hydrocarbon gas is used to heat the steam for power generation; at the same time, the exhaust heat thereof is used to dry and thy-distill low rank coal. The power generation system includes: a dry distillation step for dry-distilling low rank coal of high moisture content; a cooling step for cooling the fixed carbon obtained in the dry distillation step; a combustion step in which hydrocarbon gas obtained in the dry distillation step is used as the main fuel; and a power generation step in which there are provided a power gen-
(Continued)

erator moving a steam turbine by main steam generated in the combustion step and a condenser.

6 Claims, 9 Drawing Sheets

(51) Int. Cl.
    *C10B 31/02*     (2006.01)
    *F01K 17/02*     (2006.01)
    *C10B 47/20*     (2006.01)
    *C10B 57/10*     (2006.01)
    *C10F 5/06*     (2006.01)
    *F23K 1/04*     (2006.01)
    *F01K 7/22*     (2006.01)
    *F01K 9/00*     (2006.01)

(52) U.S. Cl.
    CPC ............... *C10B 57/10* (2013.01); *C10F 5/06* (2013.01); *F01K 7/22* (2013.01); *F01K 9/003* (2013.01); *F01K 17/02* (2013.01); *F23K 1/04* (2013.01); *F23K 2201/20* (2013.01); *F23K 2401/10* (2013.01); *Y02E 20/326* (2013.01); *Y02E 20/344* (2013.01); *Y02P 20/129* (2015.11)

(56) References Cited

U.S. PATENT DOCUMENTS

| | | |
|---|---|---|
| 5,556,436 A | 9/1996 | Yagaki et al. |
| 2010/0175364 A1 | 7/2010 | Yamamoto et al. |
| 2010/0178624 A1* | 7/2010 | Srinivasachar ......... F23K 5/002 431/253 |
| 2011/0068050 A1* | 3/2011 | Wang .................... C10B 49/10 208/409 |
| 2011/0126743 A1 | 6/2011 | Takase et al. |
| 2012/0006025 A1 | 1/2012 | Koyama et al. |
| 2012/0241306 A1 | 9/2012 | Sato et al. |

FOREIGN PATENT DOCUMENTS

| | | |
|---|---|---|
| JP | 04-140406 | 5/1992 |
| JP | 07-233384 | 9/1995 |
| JP | 2776278 | 7/1998 |
| JP | 11-264528 | 9/1999 |
| JP | 2009-133268 | 6/2009 |
| JP | 2010-59383 | 3/2010 |
| JP | 2010-144094 | 7/2010 |
| JP | 2010-097999 | 9/2010 |
| JP | 4939662 | 5/2012 |

* cited by examiner

Temperature change in Loy Yang coal during dry distillation

POWER GENERATION SYSTEM

TECHNICAL FIELD

The present invention relates to a power generation system which performs dry distillation through indirect heating utilizing the combustion heat of a fluidized bed combustor and through direct heating utilizing exhaust gas, etc., while causing low rank coal to flow down in a dry distillation furnace to thereby obtain hydrocarbon gas and fixed carbon and, using the hydrocarbon gas as the main fuel, performs power generation through heat recycling with steam from the fluidized bed combustor. Further, the fixed carbon obtained at the dry distillation furnace may be utilized as appropriate as power generation fuel, a heat source for steelmaking, and solid fuel that may be transported overseas. The present invention relates to a power generation system having excellent energy-saving efficiency.

BACKGROUND ART

The low rank coal, such as subbituminous coal or brown coal, which has a moisture content higher than about 20 mass % is limited to use within a coal-producing region. This is because, for example, the low rank coal has a low calorific value resulting from its high moisture content and generates a small amount of heat by combustion. On the other hand, when dried, the low rank coal becomes more spontaneously combustible and more hygroscopic, resulting in transportation costs being relatively expensive, etc.

However, the low rank coal has advantages that are not found, e.g., in the bituminous coal that is considered to be a high rank coal. For example, brown coal found in Australia and Indonesia is low in sulfur content and produces less ash. Thus, using the brown coal as a fuel would make it possible to prevent air pollution due to sulfur dioxide gas, etc., as well as to reduce hazardous ash waste.

In this context, such techniques have been suggested which are adopted to carbonize the low rank coal by dehydration reform or thermal reform for effective use, thereby compensating for the drawbacks thereof. For example, disclosed in Patent Literature 1 and Patent Literature 2 is a technique by which oil and low rank coal are mixed to obtain raw material slurry; the resulting slurry is heated and dehydrated in the oil, and then further heated to decompose or detach the carboxyl radical or the hydroxyl radical, etc., in the raw material coal by a decarboxylation reaction or a dehydration reaction, thereby reforming the raw material coal. Also disclosed is a technique by which heavy oil, etc., is penetrated into pores of the low rank coal so as to prevent spontaneous combustion.

On the other hand, disclosed in Patent Document 3 is a coal gasification complex power generation facility which includes the following: a gasification unit for gasifying low rank coal having a relatively high moisture content; a gas power generation unit for generating electric power using a gas supplied from the gasification unit; a steam power generation unit for generating electric power by the heat of an exhaust gas emitted from the gas power generation unit; and a coal drying unit for drying coal by the exhaust heat emitted from the steam power generation unit and supplying the dried coal to the gasification unit. Disclosed in Patent Literature 4 is a method for manufacturing reformed coal and hydrocarbon oil by thermally decomposing brown coal into reformed coal and tar under an inert gas atmosphere or steam atmosphere and catalytically cracking the tar in a steam atmosphere and in the presence of an iron-based catalyst so as to obtain hydrocarbon oil.

CITATION LIST

Patent Literature

PTL 1: Japanese Published Unexamined Patent Application No. H07-233384
PTL 2: Japanese Patent No. 2776278 PTL 3: Japanese Published Unexamined Patent Application No. 2009-133268
PTL 4: Japanese Published Unexamined Patent Application No. 2010-144094

SUMMARY OF INVENTION

Technical Problem

However, the above conventional techniques had the following problems:

(1) For Patent Literatures 1 and 2, the use of oil requires various types of facilities for separating oil and coal in the same container, causing an increase in the size of the system and hindering energy-saving efficiency;

(2) The oil or an indirect material is required for the reforming of the coal, thereby causing a significant increase in costs and imposing a high environmental load;

(3) The method which employs the oil causes a heat exchange loss of the energy provided for the brown coal, thus leading to a significant energy loss;

(4) Furthermore, the oil used as an indirect material is mixed into the dried coal, thus causing a high loss of oil and hindering resource-saving efficiency;

(5) For Patent Document 3, since the low rank coal is dried and then gasified in a gasification furnace so as to be combusted as a heat source in a boiler, it is possible to obtain a high calorific value; however, the generated gas attains high temperature; there is a great restriction in terms of the material forming the facility; thus, the technique lacks resource-saving efficiency; and (6) For Patent Literature 4, the brown coal is thermally decomposed at 500° C. to 800° C. to obtain the reformed coal and the tar, and then the tar is catalytically cracked at 400° C. to 600° C. to thereby obtain the reformed coal and a compound. However, in general, when the low rank coal is heated above 500° C., cracks are increased and fine powder is produced, causing unburned coal to increase. Furthermore, since the thermally decomposed gas may increase the risk of easily igniting combustible components or explosion of the powdered coal in a high oxygen concentration, safety and operability are lacking because it is difficult to control the operations of the system such as the control of oxygen concentration or addition of steam.

The present invention aims to solve the above conventional problems. It is an object of the present invention to provide a power generation system having the following features:

(1) The combustion heat of the hydrocarbon gas is utilized for the drying of low rank coal, thermal decomposition, the gasification of hydrocarbon, and the production of fixed carbon as well as for the heating of the steam for power generation;

(2) To be capable of making the boiler more compact by employing oxygen fluidized-bed combustion;

(3) To be capable of reducing the separation energy of carbon dioxide gas, when the carbon dioxide gas is separated and recycled, by employing oxygen combustion because nitrogen gas is considerably reduced and thus carbon dioxide gas is high in concentration;

(4) The exhaust heat of the boiler is effectively utilized, and fixed carbon is produced through dry distillation, so that the technique is excellent in resource-saving efficiency; since no indirect material such as oil is added, the fixed carbon is light, which leads to excellent transportability; and it is possible to utilize subbituminous coal, brown coal, etc., which are of high moisture content and difficult to use in places other than the point of origin, in places other than the coal-producing region;

(5) As the dry distillation furnace, there is adopted a moving bed dry distillation furnace, whereby the temperature of the product gas may be kept reduced and thus fewer restrictions are imposed on materials such as those for gas pipes, thereby providing excellent maintainability; and (6) To be capable of reducing the temperature of the product gas since a long thermal decomposition reaction time is available, so that problems due to a tar component (such as adhesion or caulking) may be solved and a large amount of relatively long-chain hydrocarbon components may be obtained.

Solution to Problem

To solve the above conventional problems, a power generation system of the present invention is arranged as described below.

The power generation system according to the first aspect of the present invention includes: a dry distillation step for dry-distilling low rank coal; a cooling step for cooling fixed carbon obtained in the dry distillation step; a combustion step in which hydrocarbon gas obtained in the dry distillation step is used as a main fuel; and a power generation step in which there are provided a power generator moving a steam turbine by main steam generated in the combustion step and a condenser.

As a result of this arrangement, the following effects are achieved:

(1) In the case where there is provided a drying step for drying low rank coal of high moisture content, the input heat value may be made small due to dry distillation, resulting in excellent energy efficiency;

(2) In the case where dried coal obtained by drying is dry-distilled, the specific gravity of the dried coal is reduced due to drying; it is possible to design the dry distillation furnace compact inclusive of the heat value for vaporizing the moisture, resulting in excellent resource-saving efficiency. Further, the dry distillation gas recycle system, etc., of the dry distillation furnace may be made compact, so that the system is excellent in resource-saving efficiency;

(3) There is provided a dry distillation step, and fixed carbon is produced by using the hydrocarbon gas generated through the dry distillation as the main fuel of the combustion step, so that the fixed carbon may be utilized as solid fuel that may be transported overseas along with the power generation system;

(4) Since there is provided a cooling step for cooling the fixed carbon obtained in the dry distillation step, it is possible to solve the problems due to the tar component by fixing the tar component surfacing as a result of the cooling after the dry distillation within the fixed carbon; the system is excellent in stable operability;

(5) Since there are provided a combustion step in which hydrocarbon gas is used as the main fuel, and a power generation step in which there are provided a power generator operating a steam turbine with the main steam generated in the combustion step and a condenser, it is possible to effectively utilize the exhaust heat by a heat medium moving between the combustion step and the condenser. Further, since hydrocarbon gas and fixed carbon are produced by a dry distillation furnace, the system is excellent in resource-saving efficiency; since no indirect material such as oil is added, the system is light and transportation costs are low; and it is possible to use subbituminous coal, brown coal, etc., which are of high moisture content and difficult to use in places other than the point of origin, in places other than the coal-producing region; and (6) Since it is a complex system performing power generation using as the main fuel the hydrocarbon gas generated in the dry distillation furnace, it is possible to utilize the system for the production of fixed carbon through drying and dry distillation of low rank coal with the combustion heat of the hydrocarbon gas (volatile content) with the heating of the steam for power generation.

Further, when the carbon dioxide gas is separated and recycled, the amount of nitrogen gas is considerably small, so that the concentration of the carbon dioxide gas is high, and it is possible to reduce the carbon dioxide gas separation energy, which leads to excellent energy-saving efficiency.

Here, the drying step may be provided prior to the dry distillation step. By drying low rank coal to obtain dried coal, the load in the dry distillation furnace is reduced, and it is also possible to reduce the size of the dry distillation furnace, so that it is possible to make the apparatus compact so that the apparatus is excellent in resource-saving efficiency.

As the dry distillation furnace for the dry distillation step, there is preferably employed a dry distillation furnace using a moving bed. As for the dry distillation, the dried coal is inserted from the furnace top of the dry distillation furnace, and the particles of the dried coal expand, and then contract while successively flowing down due to gravity; in this process, the particles continuously come into contact with high temperature steam, nitrogen gas, or carbon dioxide gas in the form of a countercurrent or parallel current with respect to the particles, whereby dry distillation is performed, and it is possible to obtain fixed carbon. Further, it is not always necessary to introduce gas for dry distillation, and the gas fed into the furnace may utilize a wide range of flow velocity.

As the dry distillation temperature of the dry distillation step, a temperature of 300° C. to 900° C., more preferably, 350° C. to 500° C., is preferably employed. This allows for reducing use of special materials that withstand high temperatures as the furnace material.

As the delivery port of the dry distillation furnace, there is preferably employed one the bottom portion angle of which is not less than an angle of repose. When the angle becomes less than an angle of repose, a bridge of fixed carbon is likely to be generated at the delivery port, and the fixed carbon tends not to flow down smoothly, which is not desirable.

As for the cooling bath for the cooling step, it may be of a structure allowing cooling and collecting of the fixed carbon dry-distilled in the dry distillation step; regarding the shape of the bottom portion thereof, there is preferably employed one the bottom portion angle of which is not less than an angle of repose. As the angle becomes less than an angle of repose, a bridge of fixed carbon is likely to be generated in the cooling bath, and the fixed carbon tends not to allow smooth extraction at the fixed carbon extraction port in the lower portion, which is not desirable. Further, in the cooling bath, it is desirable to use piping for cooling to perform cooling by a heat medium such as cooling water. This makes it possible to form the cooling bath compact. Due to indirect cooling using piping, etc., when the cooling bath is filled with an inert gas, it is possible to prevent an accident such as ignition.

Fixed carbon may be obtained by dry-distilling brown coal, etc., in the dry distillation step. Further, as a result of the removal of the hydrocarbon gas (volatile content), conversion to high rank coal occurs; and, at about 400° C., the fuel ratio of 2 of high-quality Newlands coal is exceeded, so that it is possible to produce a high rank coal level fixed carbon currently on the market. The dry distillation temperature may be appropriately selected taking the final quality into consideration. Through the conversion to fixed carbon, it is possible to use low rank coal such as subbituminous coal, brown coal, etc., which are of high moisture content and difficult to use in places other than the point of origin, in places other than the coal-producing region.

For the combustion step, there is preferably employed a fluidized bed combustor or a hydrocarbon-gas/fixed-carbon combustion boiler.

In the fluidized bed combustor, employed as a bed material is limestone or dolomite, etc. As a fuel additive, preferably employed is a mixed gas of oxygen and carbon dioxide gas for adjusting (diluting) the concentration of oxygen. The fuel used is hydrocarbon gas obtained through dry distillation, dried coal of the low rank coal that has been dried in the drying unit, reformed coal of the low rank coal that has been reformed in the reformer or char.

When hydrocarbon gas or low rank coal dried in the drying unit is used as the main fuel, it is possible to produce fixed carbon, which may be used as solid fuel in places other than the coal-producing region. When a part of the fixed carbon is used in the combustor, it is possible to recycle the surplus portion of the hydrocarbon gas and utilize it as a useful chemical raw material, so that it is possible to build a chemical complex.

Further, the combustion temperature of the fluidized bed combustor is controlled at 800° C. to 900° C. This allows for reducing use of special materials that withstand high temperatures as the furnace material and for preventing problems such as melting of ash in the fluidized bed.

It is also possible to provide a catalyst reforming unit on the downstream side of the dry distillation furnace. In this case, reforming is performed by the catalyst reforming unit which brings the volatile component obtained from low rank coal, $CO_2$, CO, and $H_2O$ of the producer gas (combustion exhaust gas) into contact with the catalyst; it is possible to obtain FT synthesis gas, methanol synthesis gas, ammonium synthesis gas, hydrogen gas, or synthetic natural gas, etc.

Regarding the power generation step, there is no particular restriction as long as power generation is performed by rotating a turbine by main steam generated using the combustor of the combustion step as the heat source. This is because it is possible to build a power generation system excellent in energy efficiency by utilizing the exhaust heat after the rotation of the turbine by the main steam.

Between the drying step and the dry distillation step, there may be provided a preprocessing step in which the dried low rank coal obtained in the drying step is heated. As the temperature of the preprocessing step, there is preferably employed a temperature lower than the temperature that is the same as that in the dry distillation step and higher than that in the drying step. By doing so, it is possible to obtain in a more stable manner, in the dry distillation step, a fixed carbon of high rank at a satisfactory yield. Further, the dry distillation furnace for the dry distillation step may be made small, which leads to excellent resource-saving efficiency. Further, a part of the dried coal obtained by the drying step may be used in the combustion step. Through an improvement in terms of the heat value of the coal used, it is possible to contribute to enhancement of the efficiency of the power generation system as a whole. Further, it is also possible to use a part of the fixed carbon after the dry distillation step. By using dried coal and fixed carbon, the enhanced dried coal helps to reduce, in the power generation plant, the load with respect to the coal handling system, and with respect to the conveyance. The enhanced dried coal is excellent in terms of transportation, and requires no equipment on a large scale, so that it is possible to reduce the maintenance cost and to increase the applicability.

The invention according to a second aspect is the power generation system according to the first aspect, wherein there is provided a drying step for drying the low rank coal to be dry-distilled in the dry distillation step prior to the dry distillation step.

As a result of this arrangement, in addition to the effects obtained according to the first aspect, it is possible to obtain the following effects:

(1) Since there is provided a drying step for drying low rank coal of high moisture content, it is possible to reduce the input heat value in the dry distillation step, so that the system is excellent in energy efficiency; and (2) Since there is provided a dry distillation step for dry-distilling the dried coal dried in the drying step, the specific gravity of the dried coal is reduced due to drying; thus, inclusive of the heat value for vaporizing the moisture, it is possible to design the dry distillation furnace compact, so that the system is excellent in resource-saving efficiency. Further, it is possible to make the dry-distilled gas recycle system etc., of the dry distillation furnace compact, so that the system is excellent in resource-saving efficiency.

Here, the drying step means an arbitrary apparatus useful in reducing the moisture amount of the granular material through direct or indirect application of heat, and should not be construed restrictively; examples of the apparatus include a fluidized bed dryer, an oscillation fluidized bed dryer, a stationary bed dryer, a traveling bed dryer, a cascade type swirling bed dryer, an elongated slot dryer, a hopper dryer, and a kiln. These dryers include an apparatus consisting of a single or multiple containers, an apparatus consisting of a single or multiple stages, an apparatus formed through stacking or an apparatus not stacked, and an apparatus having an internal or external heat exchanger.

There are no restrictions regarding the names and region of the low rank coal of high moisture content to be dried in the drying step as long as its moisture content exceeds about 20%, whether it be subbituminous coal, lignite, brown coal, etc. Further, it is not necessary for all the coal used as fuel to be low rank coal; it is also possible to add high rank coal of a moisture content of which is less than about 20 mass %. (Hereinafter, low rank coal dried through the drying step will be referred to as dried coal).

In the drying step, drying is performed in an inert gas atmosphere such as a nitrogen gas atmosphere. The target moisture of the low rank coal may be 20 mass % or less. In an experiment, it allowed a reduction to 16 mass %. As a result, it is possible to reduce the moisture content of the low rank coal to ⅓ or less, thereby substantially improving the transportation efficiency. Further, dry distillation is performed to obtain fixed carbon, whereby it is possible to prevent spontaneous combustion, thus achieving an improvement in safety.

As the inert gas, nitrogen gas is preferably employed. The nitrogen gas that is separated in an oxygen separator is used. The nitrogen gas may be heated in an air preheater which is heated with very hot water of the condenser. In this case, since the oxygen concentration is low, it is possible to prevent the low rank coal, which is spontaneously oxidized and readily increases in temperature as well as readily catches fire, from catching fire, and dry the coal at higher temperatures. Furthermore, since the nitrogen gas separated in the oxygen separator has a low relative humidity, the coal may be dried with increased efficiency. Furthermore, since waste heat is utilized without requiring additional heat energy, the system may be made environmentally friendly and excellent in energy-saving efficiency. In addition, it is possible to recycle clean water from the high humidity exhaust gas discharged from the drying unit, thus making effective use of water.

It is desirable for the low rank coal to be crushed as preprocessing before being dried. Through the crushing, the drying step is simplified, and the drying time may be shortened. The low rank coal is heated by heating the drying chamber of the drying step using a cooling drain water pipe of the condenser of the steam turbine which generates electric power with the steam superheated in the combustor. Furthermore, as a heat transfer medium, air of a low oxygen content, $CO_2$, or $N_2$ gas exchanges heat with the heated cooling drain water and is heated and is then directed into the drying step to flow counter to the flow of the low rank coal so as to dry the coal.

The invention according to a third aspect is the power generation system according to the second aspect, wherein the drying temperature in the drying step is 30° C. to 50° C.

As a result of this arrangement, in addition to the effects obtained according to the second aspect, it is possible to obtain the following effects:

(1) Since the drying temperature in the drying step is 30° C. to 50° C., the reduction ratio of the drying time with respect to the input heat value for an increase in temperature is large, resulting in excellent energy efficiency; and (2) Further, due to the temperature range of 30° C. to 50° C., and due to the excellent energy efficiency, it is possible to make the equipment volume compact, which is excellent in terms of cost.

Here, as the temperature at which drying is performed in the drying step, the temperature range of 30° C. to 50° C. is preferably adopted. In particular, as compared with the drying at 30° C., drying at a temperature around 40° C. enables the raw material coal to be dried from 60% to 50% of moisture in a time of about ⅓ less than the former, which leads to high heat efficiency. Low rank coal of high moisture content is reduced in moisture content even at room temperature in a dry atmosphere; however, this takes a considerably long period of time, which is not desirable. As the drying temperature becomes lower than 30° C., the drying time tends to be rather long, which is not desirable; on the other hand, as the temperature is raised to 50° C. or more, the drying time is shortened; however, the advantage to be expected from the input heat value with respect to the effect is small, which is not desirable. Further, when using the exhaust heat from the condenser for drying, this is applicable to drying at 50° C. or less, so that it is possible to effectively utilize the exhaust heat, which is desirable.

The invention according to a fourth aspect is the power generation system according to one of the first through third aspects, wherein the temperature in the dry distillation step is 350° C. to 500° C.

As a result of this arrangement, in addition to the effects obtained according to one of the first through third aspects, it is possible to obtain the following effects:

(1) Since dry distillation is performed at 350° C. to 500° C., the hydrocarbon gas (volatile content) is easily vaporized, and it is possible to ensure conversion to high rank coal, making it possible to obtain high rank coal of a fuel ratio of 2 or more;

(2) Since it is possible to perform dry distillation at a low temperature of 350° C. to 500° C., the system is excellent in cost-saving efficiency in terms of the cost of the apparatus itself and the input heat value; and (3) Since it is possible to perform dry distillation while retaining heavy oil, there are involved no problems such as the clogging of the reactor.

Here, as the temperature for the dry distillation step, a temperature of 350° C. to 500° C. is preferably adopted. More preferably, a temperature of 350° C. to 450° C. is preferably adopted. When the temperature is lower than 350° C., the fuel ratio is lower than 2, and it is impossible to perform effective dry distillation processing, which is not desirable; on the other hand, when the temperature exceeds 450° C., the advantage with respect to the input heat value tends to be diminished; and, when the temperature exceeds 500° C., the tendency is markedly conspicuous, which is not desirable. Further, as the temperature increases, the amount of hydrocarbon gas (volatile content) removed due to dry distillation increases; however, with that, the amount of heavy oil increases; this tends to increase problems such as the clogging of the reactor, which is likewise undesirable. Further, in general, when the low rank coal is heated above 500° C., cracks are increased and fine powder is produced, causing unburned coal to increase. And, since the thermally decomposed gas may increase the risk of easily igniting combustible components or explosion of the powdered coal in a high oxygen concentration, safety and operability are lacking because it is difficult to control the operations of the system such as the control of oxygen concentration or addition of steam. In addition, as the processing temperature increases, the material of the dry distillation furnace for the dry distillation step requires an improvement in heat resistance, an increase in the additional input heat value, etc., thus, resulting in lack of resource-saving efficiency. Thus, by performing temperature control in the range of 350° C. to 500° C., and, more preferably, 350° C. to 450° C., it is possible to perform dry distillation while retaining heavy oil within the fixed carbon, so that there occurs no problems such as the clogging of the reactor, which greatly contributes to stable operation.

Further, through volatilization and separation of the hydrocarbon gas (volatile content), conversion to high rank coal progresses; however, it is known that the gas component is vaporized even in the range of 100° C. to 300° C.; and at about 400° C., the fuel ratio of 2 of high-quality Newlands coal is exceeded; thus, it is understood that it is possible to produce a fixed carbon of a high rank coal level currently on the market.

Further, as compared with the conventionally general high-temperature dry distillation, it is performed at a much lower temperature of 350° C. to 500° C., resulting in excellent energy-saving efficiency.

The invention according to a fifth aspect is the power generation system according to one of the first through fourth aspects, which is arranged such that a fixed carbon production device includes the dry distillation step and the cooling step; and the fixed carbon production device is provided with a dry distillation furnace of the dry distillation step erected in a cooling bath for the cooling step; a dry distillation unit which is partitioned into a rectangular or a polygonal shape in the vertical direction on a horizontal cross-section in the dry distillation furnace by a separating wall from an upper portion to a lower portion; a dry distillation mini-furnace which is partitioned into a rectangular or a polygonal shape in the vertical direction on the horizontal cross-section in the dry distillation unit by a partition plate from an upper portion to a lower portion; a pipe-shaped heating means for heating which is arranged on the separating wall of the dry distillation unit and the partition of the dry distillation mini-furnace; and a collection path for collecting fixed carbon produced in the cooling bath by feeding raw material coal from the upper portion and performing dry distillation in each of the dry distillation mini-furnaces by the pipe-shaped heating means.

As a result of this arrangement, it is possible to obtain the following effects in addition to the effects obtained according to one of the first through fourth aspects:

(1) Since each dry distillation mini-furnace is equipped with a pipe-shaped heating means, indirect heating by a high temperature heat medium is possible; and the temperature in the dry distillation furnace may be easily made uniform, so that the system is excellent in yield of fixed carbon;

In addition, when the inner volume of the furnace is simply increased for mass production, it is difficult to make the temperature in the furnace uniform, and there are generated places where dry distillation partially progresses easily, etc.; and the yield of the high-quality fixed carbon is low; however, there are provided dry distillation units each equipped with many rows of dry distillation mini-furnaces, and a dry distillation furnace equipped with many rows of dry distillation units, so that the system is excellent in mass productivity;

(2) There are provided dry distillation units each formed with many rows of dry distillation mini-furnaces, and a dry distillation furnace formed with many rows of dry distillation units, so that the system exhibits high rigidity; it undergoes no deformation even when pressure is applied to the inside of the furnace due to generation of a volatile component in the dry distillation furnace or due to expansion of the raw material coal in the dry distillation furnace; thus, the system is excellent in operation stability;

(3) Since a pipe-shaped heating means is formed, it is possible to perform heating in a stable manner by means of high temperature heat medium such as steam, so that the system is excellent in operation stability;

(4) The cooling bath for collecting fixed carbon is provided in the lower portion of the dry distillation furnace, so that it is possible to collect the product fixed carbon in a stable manner; and (5) Since the system has a pipe-shaped heating means, unlike direct heating in which exhaust gas from the combustor is supplied as the heat exchange medium for the dry distillation furnace, it is possible to utilize to the utmost the heat value per unit volume of the volatile content generated by using indirect heating, thus making the system excellent in energy-saving efficiency.

Here, as an example of the dry distillation furnace, there is preferably used one of a size of about 4500 mm in the vertical direction×about 4500 mm in the lateral direction and of a height of about 5000 mm, etc. Therein, preferably, there are provided separating walls such that one dry distillation unit is of a size of about 1500 mm in the vertical direction× about 1500 mm in the lateral direction and of a height of about 5000 mm, with 3×3 rows of dry distillation units being provided in the dry distillation furnace; further, in this dry distillation unit, there are provided partition plates each being of a size in cross-section of about 500 mm in the vertical direction×about 500 mm in the lateral direction and of a height of about 5000 mm, with 3×3 rows of dry distillation mini-furnaces being provided in the dry distillation unit, etc.

In this way, stable high-yield dry distillation furnaces are combined, whereby it is possible to achieve strength in structure and stability in production even when a large amount of fixed carbon is to be produced. The cross-section shape of the dry distillation furnace is not restricted to a rectangular one; it is also possible to use as appropriate polygonal ones such as triangular, pentagonal or hexagonal ones. Further, it is possible to perform tests by using the dry distillation mini-furnace as a dry distillation furnace; thus, from the experiment system to the execution system, the system is excellent in terms of applicability and expandability according to the situation.

As the pipe-shaped heating means, which performs indirect heating by using a heat medium such as steam, the heating means may also be mounted so as to be parallel to the separating wall or the partition, or may be mounted orthogonally thereto so as to pierce through the partition plate or the separating wall; in the case of orthogonal mounting, the heating means itself serves as a baffle plate, causing the dried coal to flow down by itself; it is also possible to appropriately trap it when dry-distilling it, thus leading to an improvement in quality at the time of dry distillation, which is desirable.

It is desirable for the cooling bath for collecting fixed carbon to perform cooling at a temperature not higher than room temperature. This makes possible the prevention of oxidation of the fixed carbon. Further, as the structure of the cooling bath, it is desirable to employ a structure receiving the fixed carbon in a closed state. The interior of the cooling bath is filled with inert gas to thereby prevent oxidation of the dry-distilled coal; at the same time, the dry-distilled coal is cooled indirectly to room temperature by a water-cooling heat conduction pipe installed in the container, thereby obtaining fixed carbon. As the structure for receiving the fixed carbon in a closed state, it is desirable to employ, both on the receiving side from the dry distillation furnace and on the extraction port side for the fixed carbon, a valve of a structure such as a rotary valve which seals both the dry distillation furnace and the cooling bath. In this way, it is possible to place the cooling bath in a closed state through indirect heating, making it possible to create an inert gas atmosphere, so that it is possible to prevent an accident such as ignition, which is desirable.

As the coal fed into the dry distillation furnace, there is preferably adopted one obtained by drying brown coal. Apart from brown coal, it is also possible to employ lignite, subbituminous coal, etc., in the same manner. Examples of the brown coal that may be employed in the same manner include Victoria coal, North Dakota coal, and Berger coal, etc. While these kinds of coal have desirable properties of low ash and low sulfur content, they tend to be of high moisture content because of their porosity; since they contain a lot of moisture, they are of low calorific value, and are treated as low rank coal. These kinds of coal of high porosity and high moisture content may be employed in the same manner.

As the separating walls and partition plates, there are preferably used ones which are arranged so as to partition each dry distillation unit and each dry distillation mini-furnace from the upper portion to the lower portion, with a heating means for controlling temperature in the partitioned interiors being provided. The heating means may be arranged successively from the upper portion of the partition plate so as to divide it into a plurality of stages. It is possible to control the heating pattern so as to make rapid or gradual the dry distillation rate in the dry distillation step; this facilitates the setting of conditions for obtaining high rank coal with high efficiency, thus making the system excellent in productivity.

The invention according to a sixth aspect is the power generation system according to one of the first through fifth aspects, wherein the dried coal used in the dry distillation furnace is obtained by drying low rank coal to a moisture content of 20 mass % or less in the drying step.

As a result of this arrangement, it is possible to obtain the following effect in addition to the effects obtained according to one of the first through fifth aspects:

(1) Since there is provided a drying step for drying low rank coal of high moisture content, dried coal of a stable quality is fed into the dry distillation furnace, so that it is possible to obtain high rank fixed carbon (product dry-distilled char) in the dry distillation furnace, so that the system is excellent in quality performance.

Here, there are no restrictions regarding the names and region of the low rank coal of high moisture content to be dried in the drying step as long as its moisture content exceeds about 20%, whether it be subbituminous coal, lignite, brown coal, etc. Further, it is not necessary for all the coal used as fuel to be low rank coal; it is also possible to add high rank coal of a moisture content of which is less than about 20 mass %.

In the dryer used in the drying step, drying is performed in an inert gas atmosphere such as $N_2$ gas at low temperature (30° C. to 80° C.) and low humidity (RH 70% to 0%). The interior of the drying unit consists of hot water (about 60° C. to 90° C.) piping for warming the coal and gas piping for introducing drying gas consisting of an inert gas. The target moisture of the low rank coal may be 20 mass % or less. In an experiment, it was possible to reduce to a moisture content of 16 mass %. Thus, it is possible to reduce the moisture content of the low rank coal to ⅓ or less, and substantially improve the transportation efficiency. Further, dry distillation is performed to obtain fixed carbon, whereby it is possible to prevent spontaneous combustion, thus achieving an improvement in safety.

As the $N_2$ gas, $N_2$ gas separated by an $O_2$ separator is used. The $N_2$ gas may be heated in an air preheater which is heated with very hot water of the condenser. In this case, since the $O_2$ concentration is low, it is possible to prevent the low rank coal, which is spontaneously oxidized and readily increases in temperature as well as readily catches fire, from catching fire, and dry the coal at higher temperatures. Furthermore, since the $N_2$ gas separated in the $O_2$ separator has a low relative humidity, the coal may be dried with increased efficiency. Furthermore, since waste heat is utilized without requiring additional heat energy, the system may be made environmentally friendly and excellent in energy-saving efficiency. In addition, it is possible to recycle clean water from the high humidity exhaust gas discharged from the drying unit, thus making effective use of water.

The invention according to a seventh aspect is the power generation system according to one of the first through sixth aspects, wherein the grain size of the raw material coal used in the drying step is adjusted to 0.1 μm to 5 mm.

As a result of this arrangement, in addition to the effects obtained according to one of the first through sixth aspects, it is possible to obtain the following effect:

(1) Since the grain size is adjusted to 0.1 μm to 5 mm, the drying step is simplified, and the drying time may be shortened, so that the system is excellent in energy-saving efficiency.

Here, as the method for adjusting the low rank coal to the grain size of 0.1 μm to 5 mm, coarse crushing is performed as preprocessing prior to the drying to adjust the grain size to 0.1 μm to 5 mm. Through the crushing, the drying step is simplified, and the drying time may be shortened. The low rank coal is heated by heating the drying chamber of the drying step using a cooling drain water (at about 60° C. to 90° C.) pipe of the condenser of the steam turbine which generates electric power with the steam superheated in the fluidized bed combustor. Furthermore, as a heat transfer medium, air of a low oxygen content, $CO_2$, or $N_2$ gas exchanges heat with the heated cooling drain water and is heated (at a temperature of 60° C. to 90° C., and at an RH of 0% to 70%) and is then directed into the drying step to flow counter to the flow of the low rank coal so as to dry the coal.

The invention according to an eighth aspect is the power generation system according to one of the first through seventh aspects, wherein there is provided a heat supply unit using the exhaust heat from the condenser of the power generation step for the heating of the inert gas used for the drying in the drying step.

As a result of this arrangement, in addition to the effects obtained according to one of the first through seventh aspects, it is possible to obtain the following effect:

(1) Due to the effective utilization of exhaust heat, the system is excellent in energy-saving efficiency.

The invention according to a ninth aspect is the power generation system according to one of the first through eighth aspects, wherein there is provided a heat supply unit supplying the exhaust heat generated in the combustion step to the dry distillation step by utilizing steam, combustion exhaust gas, or a heat medium heated in the combustion step.

As a result of this arrangement, in addition to the effects obtained according to one of the first through eighth aspects, it is possible to obtain the following effects:

(1) Due to the effective utilization of the exhaust heat, the system is excellent in energy-saving efficiency;

(2) By using indirect heating utilizing the condenser exhaust heat of the power generator, it is possible to mitigate the latent heat loss in the dry distillation step, making it possible to make the equipment more compact; and (3) Due to the arrangement using indirect heating utilizing the condenser exhaust heat, it is possible to use a heat medium of high pressure and high heat capacity, and to make the apparatus compact, so that the system is excellent in terms of cost.

Here, as the method for supplying the heat generated in the combustion step to the dry distillation step, it is possible to supply the exhaust gas generated in the combustion step directly to the dry distillation furnace; in the case where the combustion step is generating steam for rotating the turbine of the power generator, the steam having rotated the turbine may be heated again in the combustion step and then being supplied to the dry distillation furnace heat exchange unit for indirect heating.

Further, low rank coal, which is of high moisture content and which is not used in places other than the coal-producing region may be used as fuel in the combustion step, so that, when this power generation system is used at the coal-producing region, it is possible to produce solid fuel (fixed carbon) while effectively utilizing inexpensive low rank coal to generate power; since it is a system effectively utilizing the exhaust heat of power generation, the system is excellent in energy-saving efficiency, making it possible to build a power generation system integrated with a solid fuel production device which makes it possible to efficiently produce solid fuel of a high fuel ratio.

Advantageous Effects of Invention

As described above, the power generation system of the present invention provides the following advantageous effects:

According to the invention of the first aspect, the following effects are obtained:

(1) It is possible to provide a power generation system excellent in energy efficiency making it possible to reduce the input heat value;

(2) The specific gravity of the dried coal is reduced due to drying, and, inclusive of the heat value for vaporizing the moisture, it is possible to design the dry distillation furnace compact, thus making it possible to provide a power generation system excellent in resource-saving efficiency;

Further, it is possible to provide a power generation system excellent in resource-saving efficiency in which it is possible to make the dry-distilled gas recycle system, etc., of the dry distillation furnace compact;

(3) The hydrocarbon gas generated through dry distillation is used as the main fuel in the combustion step, whereby it is possible to provide an excellent power generation system for producing fixed carbon;

(4) The tar component surfacing as a result of the cooling after the dry distillation is fixed within the fixed carbon, whereby it is possible to provide a power generation system which is capable of solving the problems due to the tar component and which is excellent in stable operability;

(5) Since there are provided a combustion step in which hydrocarbon gas is used as the main fuel, and a power generation step in which there are provided a power generator operating a steam turbine with the main steam generated in the combustion step and a condenser, it is possible to effectively utilize the exhaust heat by a heat medium moving between the combustion step and the condenser. Further, since hydrocarbon gas and fixed carbon are produced by a dry distillation furnace, the system is excellent in resource-saving efficiency; since no indirect material such as oil is added, the system is light and transportation costs are low; thus it is possible to provide a power generation system excellent in terms of usability which may use subbituminous coal, brown coal, etc., which are of high moisture content and difficult to use in places other than the point of origin, in places other than the coal-producing region; and (6) It is possible to provide a power generation system excellent in resource-saving efficiency which may utilize the combustion heat of the hydrocarbon gas (volatile content) for the heating of the steam for power generation and for the production of fixed carbon through drying and dry distillation of low rank coal.

Further, when separating and recycling the carbon dioxide gas, $N_2$ gas is considerably reduced and thus carbon dioxide gas is high in concentration, and it is possible to reduce the separation energy of the carbon dioxide gas, making it further possible to provide a power generation system excellent in resource-saving efficiency.

According to the invention of the second aspect, in addition to the effects of the first aspect, it is possible to obtain the following advantageous effects:

(1) It is possible to provide a power generation system excellent in energy efficiency making it possible to reduce the input heat value; and (2) The specific gravity of the dried coal is reduced due to drying, and, inclusive of the heat value for vaporizing the moisture, it is possible to design the dry distillation furnace compact, thus making it possible to provide a power generation system excellent in resource-saving efficiency;

Further, it is possible to provide a power generation system excellent in resource-saving efficiency in which it is possible to make the dry-distilled gas recycle system, etc., of the dry distillation furnace compact.

According to the invention of the third aspect, it is possible to obtain the following advantageous effects in addition to the effects of the second aspect:

(1) The reduction ratio of the drying time with respect to the input heat value for an increase in temperature is large, whereby it is possible to provide a power generation system excellent in energy efficiency; and (2) Since the system is excellent in energy efficiency, it is possible to make the equipment volume compact, making it possible to provide a power generation system excellent in terms of cost.

According to the invention of the fourth aspect, it is possible to obtain the following advantageous effect in addition to the effects of one of the first through third aspects:

(1) It is possible to provide a power generation system excellent in quality in which the hydrocarbon gas (volatile content) is removed, and in which it is possible to ensure conversion to high rank coal, making it possible to obtain high rank coal of a fuel ratio of 2 or more. Further, it is possible to perform dry distillation at a low temperature of 350° C. to 500° C., so that it is possible to provide a power generation system excellent in cost-saving efficiency in terms of the cost of the apparatus itself and the input heat value. Further, it is possible to perform dry distillation while retaining heavy oil, so that it is possible to provide a power generation system excellent in operation stability which involves no problems such as the clogging of the reactor.

According to the invention of the fifth aspect, it is possible to obtain the following advantageous effects in addition to the effects of one of the first through fourth aspects:

(1) It is possible to provide a power generation system in which indirect heating by a high temperature heat medium is possible, the temperature in the dry distillation furnace may be easily made uniform, and which is excellent in terms of the yield of fixed carbon. Further, it is possible to provide a power generation system excellent in mass productivity in which there are provided dry distillation units each equipped with many rows of dry distillation mini-furnaces, and a dry distillation furnace equipped with many rows of dry distillation units;

In addition, when the inner volume of the furnace is simply increased for mass production, it is difficult to make the temperature in the furnace uniform, and there are generated places where dry distillation partially progresses easily, etc.; and the yield of the high-quality fixed carbon is low;

(2) It is possible to provide a power generation system excellent in operation stability which is of high rigidity and which, even when pressure is applied when a volatile component is generated in the dry distillation furnace or when the raw material coal expands in the dry distillation furnace in the case where the interior of the furnace is not divided into rectangular sections, does not undergo any deformation;

(3) It is possible to provide a power generation system excellent in operation stability which may perform heating in a stable manner by a high temperature heat medium such as steam;

(4) It is possible to provide a power generation system excellent in productivity which may collect the product fixed carbon in a stable manner; and (5) It is possible to provide a fixed carbon production device excellent in energy-saving efficiency which may utilize, unlike direct heating in which exhaust gas from the combustor is supplied as the heat exchange medium for the dry distillation furnace, to the utmost the heat value per unit volume of the volatile content generated by using indirect heating, thus making the system excellent in energy-saving efficiency.

According to the invention of the sixth aspect, it is possible to obtain the following advantageous effect in addition to the effects of the first through fifth aspects:

(1) Dried coal of stable quality is fed into the dry distillation furnace, so that it is possible to provide a power generation system excellent in quality performance in which it is possible to obtain high rank fixed carbon (product dry-distilled char) in the dry distillation furnace.

According to the invention of the seventh aspect, it is possible to obtain the following advantageous effect in addition to the effects of one of the first through sixth aspects:

(1) It is possible to provide a power generation system excellent in energy-saving efficiency in which the drying step is simplified to make it possible to shorten the drying time.

According to the invention of the eighth aspect, it is possible to obtain the following advantageous effect in addition to the effects of one of the first through seventh aspects:

(1) By effectively utilizing exhaust heat, it is possible to provide a power generation system excellent in energy-saving efficiency.

According to the invention of the ninth aspect, it is possible to obtain the following advantageous effects in addition to the effects of one of the first through eighth aspects:

(1) It is possible to provide a power generation system excellent in energy-saving efficiency which effectively utilizes exhaust heat;

(2) It is possible to provide a power generation system excellent in resource-saving efficiency in which it is possible to mitigate the latent heat loss in the dry distillation step using indirect heating utilizing the condenser exhaust heat of the power generator and in which it is possible to make the system more compact; and (3) It is possible to provide a power generation system excellent in terms of cost which may use a heat medium of high pressure and high heat capacity and which allows the apparatus to be made compact.

DESCRIPTION OF EMBODIMENTS

In the following, the mode for carrying out the present invention will be described with reference to the drawings.
(Embodiments)

Figure 1:
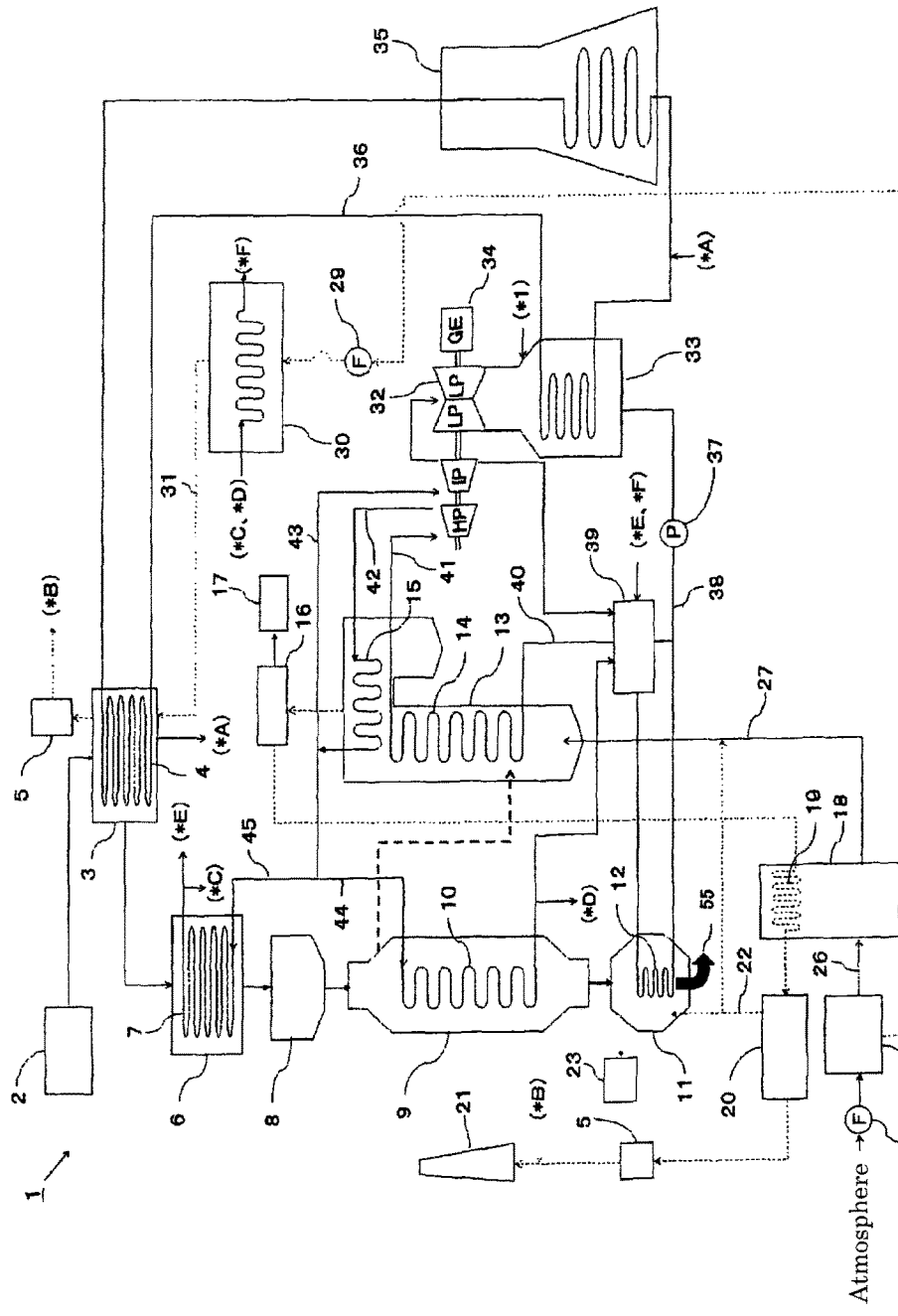
FIG. 1 is a schematic diagram illustrating a power generation system according to an embodiment.

FIG. 1 is a schematic diagram illustrating a power generation system according to an embodiment.

In the drawing, 1 denotes a power generation system; 2 denotes mining/coal-conveying equipment for mining and conveying low rank coal; 3 denotes a dryer for the drying step which dries the low rank coal such as brown coal which is an aggregate coal of a grain size of 1 μm to 5 mm and which has a moisture content of about 60 mass % to a moisture content of 20 mass % at about 30° C. to 50° C. in an $N_2$ gas atmosphere which has been warmed by an inert gas preheater 30 described below, the coal being conveyed from the mining/coal-conveying equipment 2; 4 denotes a dryer heat exchange unit warming the dryer by using the hot water of 60° C. to 90° C. connected to a condenser 33 described below; 5 denotes a dust collector performing dust collection on the exhaust air; 6 denotes a preprocessing device for warming the dried coal obtained by the dryer 3 to 200° C. to 350° C. as a pre-dry-distillation processing; 7 denotes a preprocessing device heat exchange unit which is supplied with reheated steam at 500° C. to 600° C. obtained at the fluidized bed combustor 13 described below by a reheated steam preprocessing supply unit 45 described below and performing heating to 200° C. to 350° C.; 8 denotes a dried coal bunker for feeding into the dry distillation furnace the dried coal warmed through preprocessing by the preprocessing device 6; 9 denotes a dry distillation furnace for vaporizing and separating the volatile content, tar component, etc., from the dried coal conveyed from the dried coal bunker 8 to dry-distill the coal into fixed carbon and hydrocarbon gas; 10 denotes a dry distillation furnace heat exchange unit supplied with reheated steam at 500° C. to 600° C. heated at the fluidized bed combustor 13 described below by a reheated steam dry distillation furnace supply unit 44 described below and performing heating to 350° C. to 500° C.; 11 denotes a cooling bath for cooling and extracting the fixed carbon obtained at the dry distillation furnace 9; 12 denotes a cooling bath heat exchange unit performing cooling to a temperature not higher than room temperature for the cooling of the cooling bath 8 from a water supply unit 38 described below; 13 denotes a fluidized bed combustor supplied with the hydrocarbon gas produced through dry distillation at the dry distillation furnace 9 as main fuel and generating heat for the main steam for a steam turbine 32 described below; 14 denotes a combustor main steam heat exchange unit generating the main steam for the steam turbine 32 described below by the heat of the fluidized bed combustor 13; 15 denotes a reheated steam heat exchange unit heating again the steam after having rotated the steam turbine 32 described below by the heat of the fluidized bed combustor 13 to create reheated steam; 16 denotes a cyclone separating solid component from the exhaust gas of the fluidized bed combustor 9 by centrifugal force; 17 denotes an ash processing device processing the ash separated by the cyclone 16; 18 denotes a combustion air preheater for performing heat exchange in order to utilize the exhaust gas supplied through piping from the cyclone 16 for the warming of $O_2$ obtained from an $O_2$ separator 25 described below; 19 denotes a combustion air preheater heat exchange unit of the combustion air preheater 18; and 20 denotes a $CO_2$ separation device for separating $CO_2$ from the exhaust gas heat-recycled by the combustion air preheater 18, the removal of dust, etc., from the exhaust gas after the separation of $CO_2$ by the $CO_2$ separation device 20 being performed by the dust collector 5. 21 denotes a chimney for discharging exhaust gas from which dust, etc., has been removed by the dust collector 5; 22 denotes a $CO_2$ supply unit for supplying the $CO_2$ separated by the $CO_2$ separation device 20 to the cooling bath 11 and a pre-heated $O_2$ supply unit 27 described below; 23 denotes a CCS for recycling and utilizing the $CO_2$ having passed the cooling bath 11; 24 denotes a forced draft fan for sending air from atmosphere to an $O_2$ separator described below; 25 denotes an $O_2$ separator separating the $O_2$ gas and the $N_2$ gas from the atmospheric air forced in by the forced draft fan 24 and sending these gases to the combustion air preheater 18; 26 denotes an $O_2$ supply unit for supplying the $O_2$ separated by the $O_2$ separator 25 to the combustion air preheater 18; 27 denotes a pre-heated $O_2$ supply unit mixing the $O_2$ warmed by the combustion air preheater 18 with the $CO_2$ from the $CO_2$ supply unit 22 and supplying the mixture to the fluidized bed combustor; the $O_2$ gas obtained from the $O_2$ separator 25 passes through the $O_2$ supply unit 26, and is pre-heated by the combustion air preheater 18 to be used as the fuel additive of the fluidized bed combustor 13. Further, the $N_2$ gas simultaneously obtained is heated by an inert gas preheater 30 described below and is used for the drying of low rank coal. 28 denotes an $N_2$ gas supply unit supplying the $N_2$ gas separated from the atmosphere by the $O_2$ separator 25 to the inert gas preheater 30 described below; 29 denotes a dry air forced draft fan for forcing the inert gas the main component of which is the $N_2$ gas of the $N_2$ gas supply unit 28 into an inert gas preheater 30 described below; and 30 denotes an inert gas preheater for pre-heating the inert gas; the inert gas preheater 30 uses the exhaust heat after the heat exchange at the preprocessing device heat exchange unit 7 or the dry distillation furnace heat exchange unit 4. 31 denotes a pre-heated $N_2$ supply unit supplying the $N_2$ warmed by the inert gas preheater 30 to the dryer heat exchange unit 4; 32 denotes a steam turbine rotating the power generator with the main steam of the fluidized bed combustor 13; 33 denotes a condenser; 34 denotes a power generator; 35 denotes a cooling tower; 36 denotes a condenser exhaust heat supply unit supplying the exhaust heat of the condenser to the dryer heat exchange unit 4 of the dryer 3; 37 denotes a steam drive type water supply pump; 38 denotes a water supply unit sending the water of the condenser to the cooling bath heat exchange unit 12 of the cooling bath 11 and to a water supply heater 39 described below; 39 denotes a water supply heater for pre-heating the water from the preprocessing device heat exchange unit 7, the dry distillation furnace heat exchange unit 10, the cooling bath heat exchange unit 12, the inert gas preheater 30, and the water supply unit 38 with the steam (extracted steam) from the combustor main steam heat exchange unit 14 and the turbine; 40 denotes a heated water supply unit for supplying heated water from the water supply heater 39 to the combustor main steam heat exchange unit 14; 41 denotes a main steam supply unit for supplying main steam from the combustor main steam heat exchange unit 14 to the turbine; 42 denotes a reheated steam supply unit for supplying the steam having rotated the turbine to the reheated steam heat exchange unit for reheating; 43 denotes a reheated steam return unit returning a part of the reheated steam to the turbine again; 44 denotes a reheated steam dry distillation furnace supply unit for supplying reheated steam to the dry distillation furnace heat exchange unit 10; and 45 denotes a reheated steam preprocessing device supply unit for supplying reheated steam to the preprocessing device heat exchange unit 7. 55 denotes fixed carbon such as char produced.

More specifically, in the present embodiment, the heated water supplied from the heated water supply unit 40 is converted to main steam at the combustor main steam heat exchange unit 14 of the fluidized bed combustor 13. This main steam is supplied to the steam turbine 32 by using the main steam supply unit 41. The steam having rotated the steam turbine 32 is supplied to the reheated steam heat exchange unit 15 by using the reheated steam supply unit 42, and is reheated at the reheated steam heat exchange unit 15 to be turned into reheated steam. A part of this reheated steam is supplied to the steam turbine 32 again by using the reheated steam return unit 43. The reheated steam is supplied to the dry distillation furnace heat exchange unit 10 and the preprocessing device heat exchange unit 7 mainly by the reheated steam dry distillation furnace supply unit 44 and the reheated steam preprocessing device supply unit 45. Further, the reheated steam used in the dry distillation furnace heat exchange unit 10 and the preprocessing device heat exchange unit 7 is supplied to the water supply heater 39 after being partly used by the inert gas preheater 30, or as it is. A part of cold water of the water supply unit 38 is used to cool the fixed carbon at the cooling bath heat exchange unit 12 and is warmed before being supplied to the water supply heating portion 39. In this way, exhaust heat is utilized between the heat media such as water and steam, so that it is possible to reduce the burden on the fluidized bed combustor 13, the cooling tower 35, and the water supply heater 39, so that the system is excellent in resource-saving efficiency.

Further, as the fuel of the combustor, it is possible to use a part of the fixed carbon 55. In this case, when the fixed carbon 55 is fed into the fluidized bed combustor 13 as the requisite input heat for the dryer 3 and the dry distillation furnace 9, the requisite energy for generating the fixed carbon itself is lost; however, it is also possible to utilize it as a means for securing the heat source for the dryer 3 and the dry distillation furnace 9; thus, the system is excellent in fuel selectivity.

The power generation system, arranged as described above will be described as follows in terms of each unit operation.

(1) The low rank coal is coarsely crushed in advance, e.g., in a ball mill and separated and transferred in an air current, and then supplied to the dryer 3 of the power generation system.

(2) In the dryer 3, the moisture content of the low rank coal the grain size of which is adjusted to 0.1 μm to 5 mm is reduced to 20 mass % or less, so that the drying is performed with a drying gas the relative humidity of which is 0% to 70% and at a temperature in the dryer ranging from 30° C. to 50° C. As the drying gas, there is utilized the exhaust heat from the condenser 33 and the exhaust heat recycled from the steam turbine, the combustor bed material, and the fixed carbon.

(3) As the dry distillation furnace 9, it is desirable to adopt the moving bed system indirectly heated to 350° C. to 500° C. This makes it possible to obtain fixed carbon while retaining the tar component, making it possible to prevent problems such as caulking of the tar component. Further, it is possible to extract the hydrocarbon gas of the light oil component, thus making it easier to handle the combustor.

(4) The fluidized bed combustor 13 uses a fuel additive obtained by diluting the oxygen separated by the $O_2$ separator 25 for separating oxygen from the atmosphere by carbon dioxide gas obtained as by-product or separated from the $CO_2$ separation device 20.

(5) The $CO_2$ separation device 20 employs a solid reform catalyst such as iron or an alkaline component. More specifically, it is possible to utilize a fixed bed, etc., which employs a perovskite carrying alkaline earth catalyst. This makes it possible to decompose a heavy component such as a tar component into a light component.

(6) Since there is provided a drying step for drying low rank coal of high moisture content at 30° C. to 50° C., it is possible to reduce the input heat value, so that the system is excellent in energy efficiency.

(7) Since there is provided a dry distillation step for dry-distilling dried coal obtained by drying low rank coal the grain size of which is adjusted to 0.1 μm to 5 mm to a moisture content of 20 mass % or less by the drying step, the specific gravity of the dried coal is reduced due to drying; thus, inclusive of the heat value for vaporizing the moisture content, it is advantageously possible to design the dry distillation furnace compact. Thus, the burden on the dry distillation furnace is small, and the equipment may be made small, so that the system is excellent in resource-saving efficiency.

(8) Since there is provided a cooling bath for cooling the fixed carbon obtained in the dry distillation furnace, it is possible to solve the problems due to the tar component by fixing the tar component surfacing as a result of the cooling after the dry distillation within the fixed carbon; the system is excellent in stable operability.

(9) Since there are provided a fluidized bed combustor in which hydrocarbon gas is used as the main fuel, and a power generation step in which there are provided a power generator operating a steam turbine with the main steam generated in the fluidized bed combustor and a condenser, it is possible to effectively utilize the exhaust heat by a heat medium moving between the fluidized bed combustor and the condenser. Further, since hydrocarbon gas and fixed carbon are produced by a dry distillation furnace, the system is excellent in resource-saving efficiency; since no indirect material such as oil is added, the system is light, which leads to excellent transportability; and it is possible to use subbituminous coal, brown coal, etc., which are of high moisture content and difficult to use in places other than the point of origin, in places other than the coal-producing region.

(10) Since it is a complex system performing power generation using as the main fuel the hydrocarbon gas generated in the dry distillation furnace, it is possible to utilize the system for the production of fixed carbon through drying and dry distillation of low rank coal with the combustion heat of the hydrocarbon gas (volatile content) with the heating of the steam for power generation.

Further, when the carbon dioxide gas is separated and recycled, the amount of $N_2$ gas is considerably small, so that the concentration of the carbon dioxide gas is high, and it is possible to reduce the carbon dioxide gas separation energy, which leads to excellent energy-saving efficiency.

(11) Since the dry distillation is performed at 350° C. to 500° C., the input heat value is small, making it possible to provide a power generation system excellent in energy efficiency. Further, the specific gravity of the dried coal is reduced due to drying, and, inclusive of the heat value for vaporizing the moisture, it is possible to design the dry distillation furnace compact, so that the system is excellent in resource-saving efficiency. Further, it is possible to make the dry distillation gas recycle system, etc., of the dry distillation furnace compact, so that the system is excellent in resource-saving efficiency.

(12) Since there are provided a fluidized bed combustor in which hydrocarbon gas is used as the main fuel, and a power generation step in which there are provided a power generator operating a steam turbine with the main steam generated in the fluidized bed combustor and a condenser, it is possible to effectively utilize the exhaust heat by a heat medium moving between the fluidized bed combustor and the condenser. Further, since hydrocarbon gas and fixed carbon are produced by a dry distillation furnace, the system is excellent in resource-saving efficiency; since no indirect material such as oil is added, the system is light and transportation costs are low; and it is possible to use sub-bituminous coal, brown coal, etc., which are of high moisture content and difficult to use in places other than the point of origin, in places other than the coal-producing region; thus, the system is excellent in terms of usability.

The fixed carbon is dry-distilled at 350° C. to 500° C., whereby the hydrocarbon gas (volatile content) is removed, and it is possible to ensure the conversion to high rank coal, making it possible to obtain a high rank coal of a fuel ratio of 2 or more, which helps to reduce the production cost of the apparatus itself; thus, the system is excellent in resource-saving efficiency and in energy-saving efficiency due to the small input heat value.

(13) The combustion heat of the hydrocarbon gas (volatile content) may be used, together with the heating of the steam for power generation, for the production of fixed carbon through drying and dry distillation of low rank coal; thus, the system is excellent in resource-saving efficiency.

Further, when the carbon dioxide gas is separated and recycled, the amount of nitrogen gas is considerably small, so that the concentration of the carbon dioxide gas is high, and it is possible to reduce the carbon dioxide gas separation energy, so that the system is even further excellent in resource-saving efficiency as a system.

(14) Since the drying temperature in the drying step is 30° C. to 50° C., the reduction ratio of the drying time with respect to the input heat value for an increase in temperature is large, resulting in excellent energy efficiency.

Further, the drying temperature is 30° C. to 50° C., and due to the excellent energy efficiency, it is possible to make the equipment volume compact; thus, the system is excellent in terms of cost.

Further, due to the temperature range of 30° C. to 50° C., it is possible to perform heating to the drying temperature with the exhaust heat from the condenser, so that the system is excellent in energy efficiency.

(15) Since each dry distillation mini-furnace is equipped with a pipe-shaped heating means, indirect heating by a high temperature heat medium is possible; and the temperature in the dry distillation furnace may be easily made uniform, so that the system is excellent in yield of fixed carbon. Further, there are provided dry distillation units each equipped with many rows of the dry distillation mini-furnaces, and a dry distillation furnace equipped with many rows of dry distillation units, so that the system is excellent in mass productivity.

In addition, when the inner volume of the furnace is simply increased for mass production, it is difficult to make the temperature in the furnace uniform, and there are generated places where dry distillation partially progresses easily, etc.; and the yield of the high-quality fixed carbon is low.

(16) There are provided dry distillation units each formed with many rows of dry distillation mini-furnaces, and a dry distillation furnace formed with many rows of dry distillation units, so that the system exhibits high rigidity; and it undergoes no deformation even when pressure is applied to the inside of the furnace due to generation of a volatile component in the dry distillation furnace or due to expansion of the raw material coal in the dry distillation furnace in the case where the interior of the furnace is not divided into rectangular sections; thus, the system is excellent in operation stability.

(17) Since a pipe-shaped heating means is formed, it is possible to perform heating in a stable manner by means of high temperature heat medium such as steam, so that the system is excellent in operation stability.

(18) The cooling bath for collecting fixed carbon is provided in the lower portion of the dry distillation furnace, so that it is possible to collect the product fixed carbon in a stable manner.

(19) Due to the effective utilization of the exhaust heat, the system is excellent in energy-saving efficiency.

(20) By using indirect heating utilizing the condenser exhaust heat of the power generator, it is possible to mitigate the latent heat loss in the dry distillation step, making it possible to make the system more compact.

(21) Due to the arrangement using indirect heating utilizing the condenser exhaust heat, the heat medium employed is of high pressure and of high heat capacity, so that it is possible to make the apparatus compact, so that the system is excellent in terms of cost.

Figure 2:
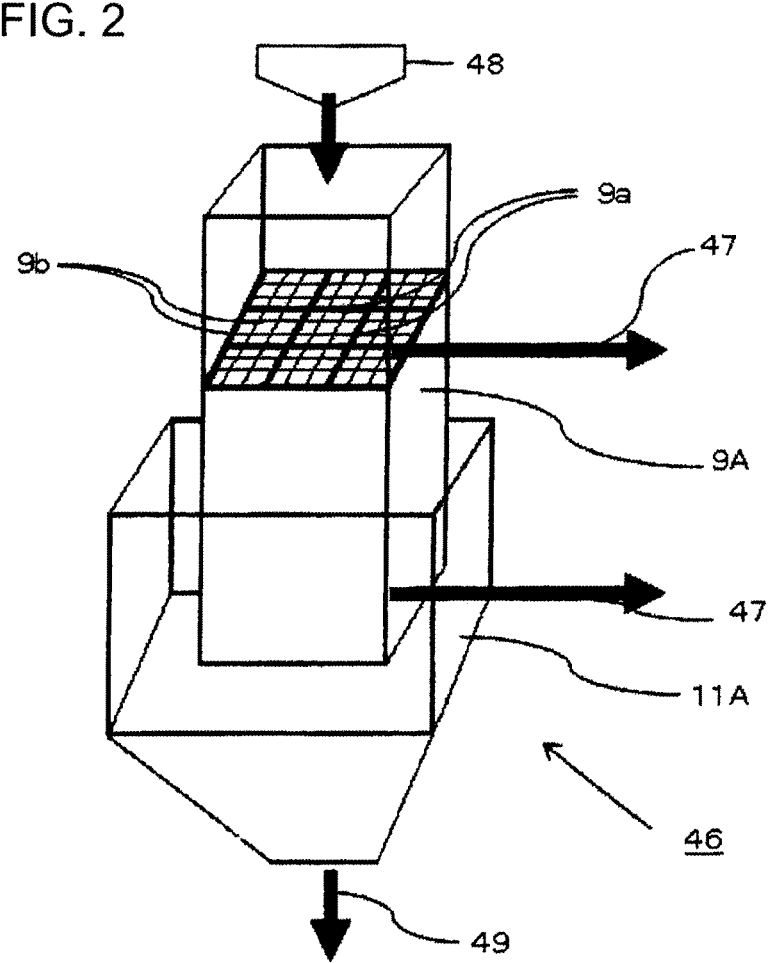
FIG. 2 is a schematic diagram illustrating a fixed carbon production device according to an embodiment.

FIG. 2 is a schematic diagram illustrating a fixed carbon production device according to an embodiment.

In FIG. 2, 9A denotes a dry distillation furnace which has a dry distillation unit divided by a separating wall described below erected in the upper portion of the cooling bath, and dry distillation mini-furnaces divided by a partition plate described below provided in the dry distillation unit, steam piping and high temperature waste gas piping which are heated to a temperature of 500° C. to 600° C. are provided on the inner surface of the dry distillation furnace, the separating wall, and the partition plate, and dry-distills fed-dried brown coal at a temperature of 350° C. to 500° C.; 9a denotes a separating wall arranged vertically from the upper portion to the lower portion of the dry distillation furnace to divide the dry distillation furnace 9A into rectangular dry distillation units; 9b denotes partition plates arranged vertically from the upper portion to the lower portion of the dry distillation furnace to divide each dry distillation unit divided by the separating wall 9a into rectangular dry distillation mini-furnaces; 11A denotes a cooling bath for cooling and receiving the fixed carbon (product dry-distilled char); 46 denotes a fixed carbon production device consisting of the dry distillation furnace and the cooling bath; denotes dry distillation gas piping for recycling dry distillation gas produced through dry distillation which is provided in the upper portion or the lower portion; 48 denotes a dried brown coal feeding device for feeding into the dry distillation furnace dried brown coal obtained through drying of low rank coal to a moisture content of not more than 20 mass %; and 49 denotes an extraction port for the fixed carbon (product dry-distilled char).

The fixed carbon production device of the power generation system of the present embodiment arranged as described above provides the following effects:

(1) Each of the dry distillation mini-furnaces is equipped with a pipe-shaped heating means, so that indirect heating by a high temperature heat medium is possible; and it is easy to uniformly heat the interior of the dry distillation furnace, making it possible to prevent generation of heating spots. Further, there are provided dry distillation units each equipped with many rows of the dry distillation mini-furnaces, and a dry distillation furnace equipped with many rows of the dry distillation units, so that the device is excellent in rigidity and durability;

(2) There are provided dry distillation units each formed with many rows of dry distillation mini-furnaces, and a dry distillation furnace formed with many rows of dry distillation units, so that the system exhibits high rigidity; and it undergoes no deformation even when pressure is applied to the inside of the furnace due to generation of a volatile component in the dry distillation furnace or due to expansion of the raw material coal in the dry distillation furnace in the case where the interior of the furnace is not divided into rectangular sections; thus, the device is excellent in operation stability;

(3) A pipe-shaped heating means is formed on the separating wall and the partition plate of the dry distillation furnace, so that it is possible to perform heating in a stable manner with a high temperature heat medium such as steam; thus, the device is excellent in operation stability;

(4) Since a cooling bath for collecting fixed carbon is provided in the lower portion of the dry distillation furnace, it is possible to cool the fixed carbon reformed in the dry distillation furnace and to collect the fixed carbon (product dry-distilled char) in a stable manner;

(5) Since the dry distillation is performed at 350° C. to 600° C., the hydrocarbon gas (volatile content) is removed, and it is possible to convert to high rank coal, making it possible to obtain a high rank coal of a fuel ratio of 2 or more;

(6) Since it is possible to perform the dry distillation at a low temperature of 350° C. to 600° C., the device is excellent in cost-saving efficiency in terms of the cost of the device itself and the input heat value; and (7) Since it is possible to perform the dry distillation while retaining heavy oil, there are no problems such as the clogging of the reactor.

Experiment Example 1

Dry Distillation Test

In experiment example 1, the dry distillation temperature of the moving bed indirect heating dry distillation furnace was examined.

Figure 3:
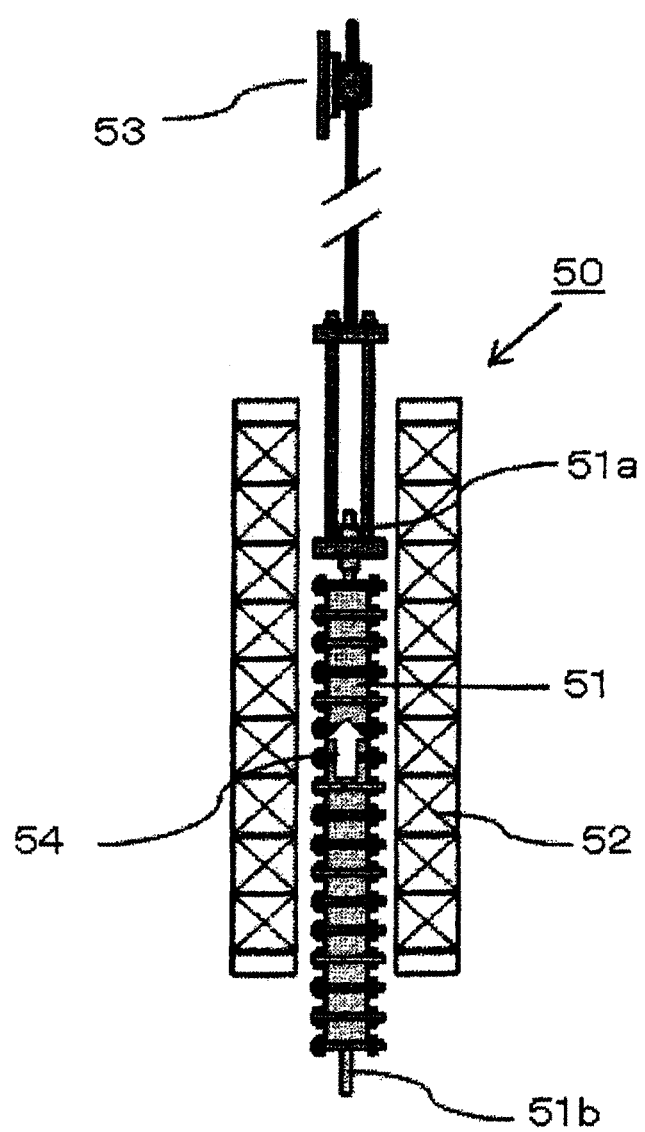
FIG. 3 is a schematic diagram illustrating a simulated moving bed indirect heating dry distillation furnace.

FIG. 3 is a schematic view of the simulated moving bed indirect heating dry distillation furnace used for collecting test data of the present embodiment.

In FIG. 3, 50 denotes a simulated moving bed indirect heating dry distillation furnace; 51 denotes a container furnace filled with a brown coal specimen (which was obtained through pre-heating and drying Loy Yang brown coal (raw coal) in the atmosphere and at room temperature to reduce its moisture content to around 20 mass %, setting the grain sizes to 0.3 mm to 0.5 mm through crushing/classification, drying the resultant coal in an inert gas atmosphere at 110° C., and removing the moisture therefrom) and partitioned in the length direction and the perpendicular direction (horizontal plane direction) with a SUS mesh; 51a denotes an inert gas feeding port through which $N_2$ gas is caused to flow in at a rate of 200 ml/min to create an inert gas atmosphere in the container furnace 51; 51b denotes an inert gas outlet for the inert gas input from the inert gas feeding port 51a; 52 denotes an electric furnace arranged in many stages in order to form a temperature distribution; 53 denotes a motor for moving the container furnace 51 inside the electric furnace 52 at a constant speed for spuriously preparing the data regarding the carbon flowing down in the furnace; and 54 denotes the moving direction of the container furnace.

The inert gas flows from the inert gas feeding port 51a toward the inert gas outlet 51b in FIG. 3 (from the upper side toward the lower side in FIG. 3).

The simulated moving bed indirect heating dry distillation furnace 50 is a device simulating the brown coal conversion characteristics and the gasification characteristics in the dry distillation. The container furnaces 51 of cylindrical reactors formed of SUS are fixed in series in 15 stages, and these are raised by the motor 53 in the direction of the moving direction 54 from the lower portion toward the upper portion of the vertical electric furnaces 52 arranged in a number of stages, whereby there was obtained the test data when the brown coal filled in the container furnace 51 flowed down from the upper portion to the lower portion of the moving bed. From the upper side in FIG. 3, the container furnaces 51 were numbered as the first, second, . . . , to 15th container. There were provided nine electric furnaces 52; and the first through fourth electric furnaces as ordered from the lower side in FIG. 3 were set to 165° C., the fifth furnace was set to 300° C., the sixth furnace was set to 400° C., the seventh furnace was set to 500° C., the eighth furnace was set to 600° C., and the ninth furnace was set to 700° C., respectively. It is noted that the container furnaces 51 were raised at a rate of 6.9 mm/min within the electric furnaces 52. The temperature rise rate at this time of the container furnaces 51 was about 10° C./min. Of the fifteen container furnaces 51, the container furnaces 51 which have passed the electric furnace uppermost portion were the first through sixth container furnaces 51.

Figure 4:
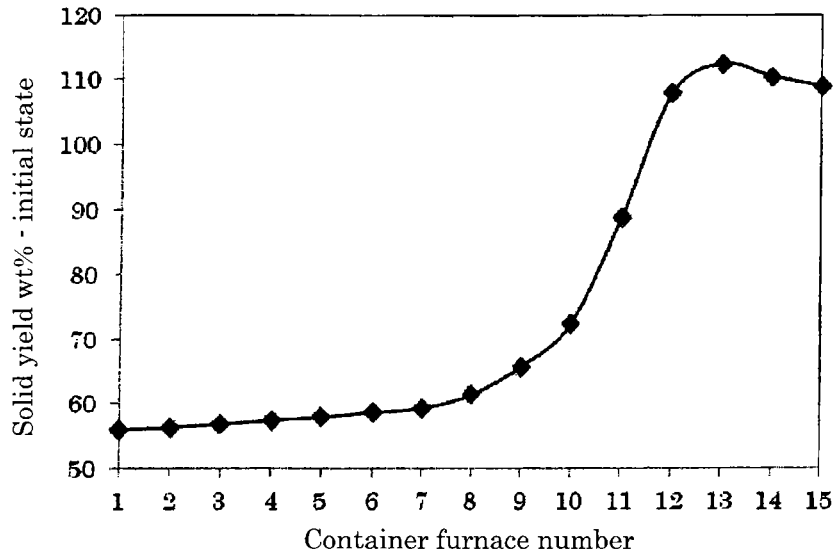
FIG. 4 is a graph illustrating analysis results of dry-distilled coal according to dry distillation temperatures.

FIG. 4 and (Table 1) are graphs showing the dry-distilled coal analysis results according to the dry distillation temperatures. More specifically, FIG. 4 shows the solid yields of the respective containers obtained based on the mass of the solid remaining after the completion of the experiment using the simulated moving bed indirect heating dry distillation furnace 50 of FIG. 3.

At this time, the first through sixth of the container furnaces 51 have passed the electric furnaces; the seventh through eleventh container furnaces 51 correspond to 200° C. to 595° C. of the thermal decomposition zone; and the 12th to 15th container furnaces 51 are the portions heated at 165° C. and they are at a temperature of about 140° C.

The carbide yield at the first container furnace 51 was 56 mass %; the carbide yield gradually increased from the second to the sixth container furnaces 51, i.e., the lower the stage; and the yield attained 58.7 mass % at the sixth container furnace 51. This resulted from the volatile component containing heavy oil generated from the upper stage container coming into contact with the brown coal carbide and half-carbide of the lower stage, with the carbide yield increasing due to sorption of the heavy oil and co-carbonization of the heavy oil and the brown coal. Further, from the 12th container furnace 51 onward, there was recognized an increase in weight by 10% to 20% of deadweight probably attributable mainly to the sorption of the heavy oil. On the downstream side of the reactor (the 12th to 15th container furnaces 51), the production gas and the condensation component were recycled, and the recycle rate of these generated products was 99% or more. As a result of the analysis of the recycled condensation component, it was found that the high boiling point heavy oil condensed due to the presence of a low temperature portion in the furnace; further, it is possible to perform selective production of light oil components through supply of heavy oil due to the brown coal particles present here; and, as shown in FIG. 4 and (Table 1), in the temperature range of 200° C. to 595° C., dry distillation rapidly progressed in the moving bed indirect heating dry distillation furnace, making it possible to retain the heavy oil component in the fixed carbon.

TABLE 1

| | Container furnace number | | | | | | | |
|---|---|---|---|---|---|---|---|---|
| | 1 | 2 | 3 | 4 | 5 | 6 | 7 | 8 |
| Solid yield (mass %) | 56 | 56.4 | 56.9 | 57.5 | 57.9 | 58.7 | 59.3 | 61.4 |

| | Container furnace number | | | | | | | |
|---|---|---|---|---|---|---|---|---|
| | 9 | 10 | 11 | 12 | 13 | 14 | 15 | — |
| Solid yield (mass %) | 65.7 | 72.4 | 88.9 | 107.9 | 112.4 | 110.4 | 108.9 | — |

Experiment Example 2

Evaluation Test Through Thermogravimetric Analysis

In experiment example 2, the dry distillation temperature was examined through thermogravimetric analysis.

Figure 5:
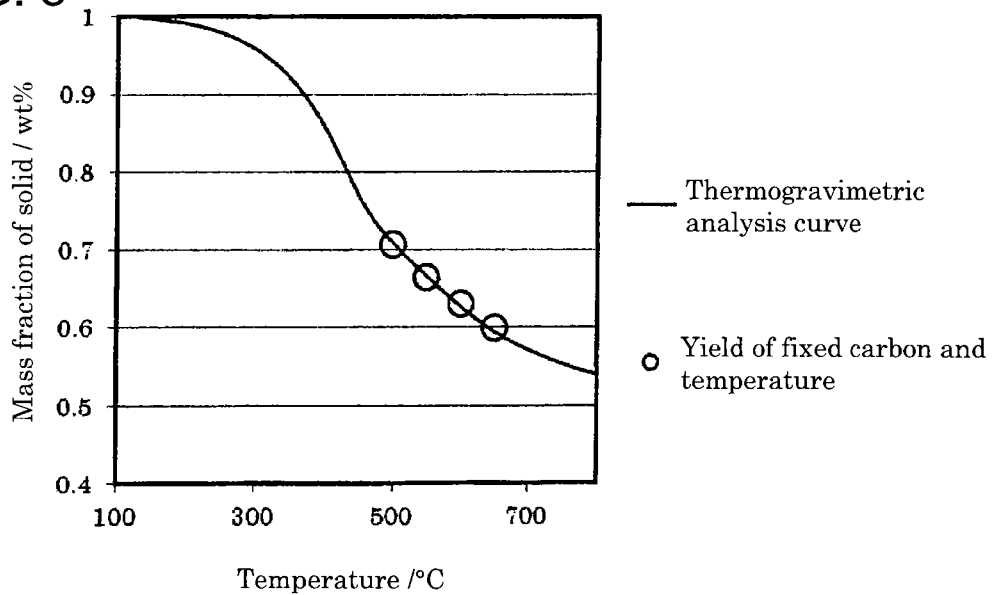
FIG. 5 is a graph illustrating thermogravimetric analysis results of dry-distilled coal according to dry distillation temperatures.

FIG. 5, (Table 2), and (Table 3) are graphs showing the results of the dry-distilled coal thermogravimetric analysis according to the dry distillation temperatures. More specifically, in order to check the dry distillation temperature through thermal decomposition of brown coal, Loy Yang brown coal (raw coal) was pre-heated and dried at room temperature and in the atmosphere to reduce its moisture content to around 20 mass %; then, its grain sizes were set to 0.3 mm to 0.5 mm through crushing/classification, and the coal was dried in an inert gas atmosphere at 110° C. to remove moisture therefrom; the resultant coal was measured by using a thermogravimetric analysis apparatus (EXSTAR TG/DTA 6000 manufactured by SII Nanotechnology Inc.) to obtain the following results.

As shown in FIG. 5, (Table 2), and (Table 3), it is recognized that the brown coal weight began to decrease at around 350° C., with the dry distillation being conspicuous from this temperature. Further, in a stationary bed dry distillation furnace, a similar specimen was dry-distilled in a nitrogen stream at 500° C., 550° C., 600° C., and 650° C., with the temperature rise rate being 10° C./min, and the retaining time at the peak temperature being zero seconds. The relationship between the fixed carbon yield and the temperature at this time is plotted in FIG. 5. By checking the graph, it is understood that the results of the thermogravimetric analysis and the temperature definition in the dry distillation furnace are in a satisfactory correlationship. The results of the dry-distilled coal thermogravimetric analysis in FIG. 5 are plotted in (Table 2), and the relationship between the fixed carbon yield and temperature in FIG. 5 is plotted in (Table 3).

TABLE 2

| | Temperature (° C.) | | | | | | |
|---|---|---|---|---|---|---|---|
| | 200 | 300 | 400 | 500 | 600 | 700 | 800 |
| Weight change amount (mass %) | 0.99 | 0.95 | 0.85 | 0.7 | 0.62 | 0.57 | 0.53 |

TABLE 3

| Peak temperature (° C.) | 500 | 550 | 600 | 650 |
|---|---|---|---|---|
| Yield of fixed carbon | 0.71 | 0.67 | 0.63 | 0.6 |

Experiment Example 3

High Rank Conversion Temperature Demonstration Test

In experiment example 3, the requisite temperature for conversion from low rank coal to high rank coal was examined.

Figure 6:
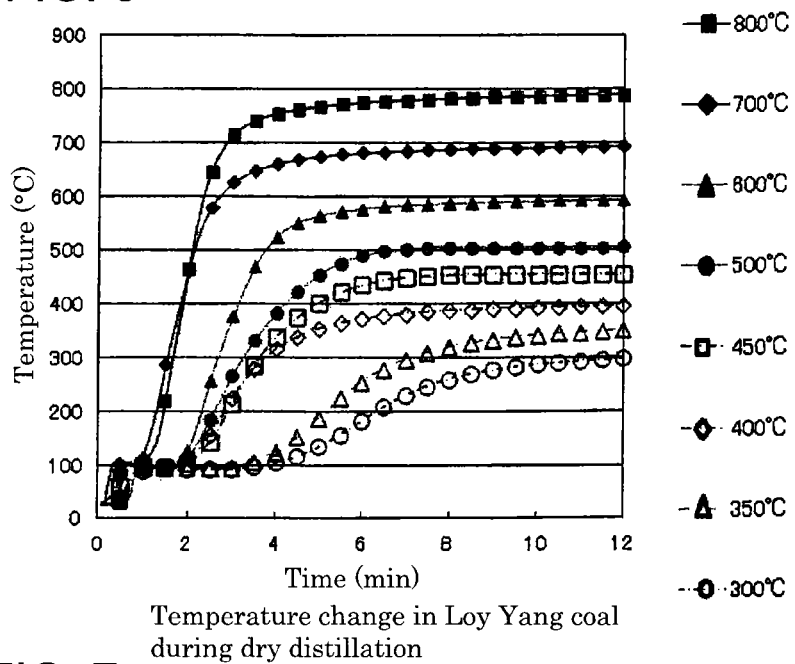
FIG. 6 is a graph illustrating temperature change in brown coal in a dry distillation furnace.

FIG. 6 and (Table 4) are graphs showing temperature changes in brown coal inside the dry distillation furnace. More specifically, Loy Yang brown coal (raw coal) was placed in a horizontally installed tubular furnace with $N_2$ gas circulating therethrough; in this state, the in-furnace temperature was raised to each measurement temperature, and the temperature change time at that time and each temperature were measured.

As shown in FIG. 6, it is understood that even after the moisture had vaporized at around 100° C., the temperature increased gradually; even when the set temperature was 300° C., there was a latent heat component, which shows that conversion to high rank coal occurred.

TABLE 4

| | | | | Reaction time (min) | | | | | | | | |
|---|---|---|---|---|---|---|---|---|---|---|---|---|
| | | | 1 | 2 | 3 | 4 | 5 | 6 | 7 | 8 | 9 | 10 |
| Set temperature (° C.) | 300 | Specimen temperature (° C.) | 88 | 93 | 93 | 104 | 133 | 182 | 229 | 259 | 276 | 287 |
| | 350 | | 96 | 95 | 95 | 124 | 187 | 254 | 296 | 319 | 333 | 341 |
| | 400 | | 96 | 115 | 225 | 315 | 352 | 371 | 381 | 386 | 390 | 392 |
| | 500 | | 97 | 111 | 265 | 381 | 453 | 489 | 500 | 500 | 500 | 500 |
| | 600 | | 101 | 127 | 376 | 525 | 565 | 578 | 584 | 588 | 590 | 592 |
| | 700 | | 114 | 462 | 626 | 661 | 675 | 682 | 685 | 688 | 690 | 691 |
| | 800 | | 102 | 464 | 715 | 753 | 767 | 774 | 778 | 782 | 784 | 786 |

Experiment Example 4

Dry Distillation Temperature Effect Test

In experiment example 4, dry distillation temperature and the performance of the resultant fixed carbon were examined.

Figure 7:
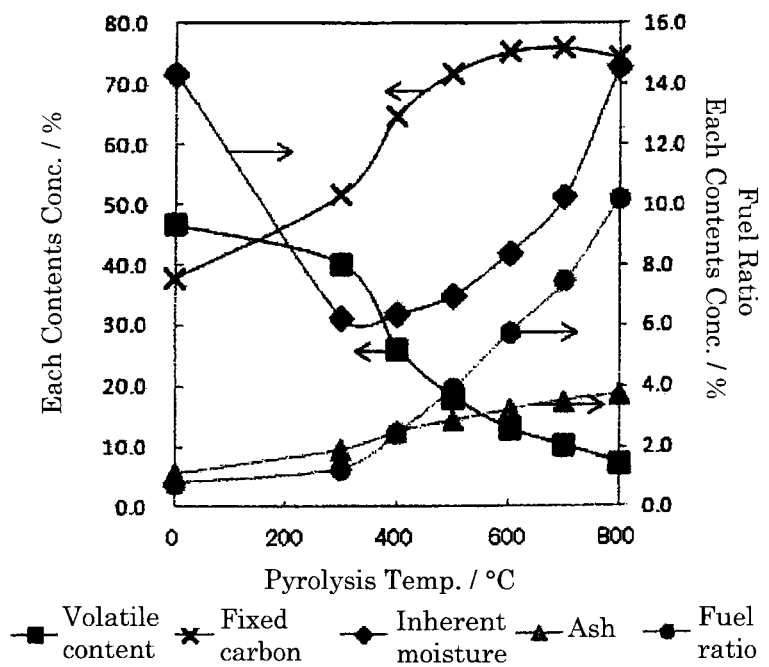
FIG. 7 is a graph illustrating changes in various combustion-related components of the fixed carbon according to the brown coal dry distillation processing temperatures.

FIG. 7 and (Table 5) are graphs showing changes in various combustion-related components of the fixed carbon at the brown coal dry distillation processing temperatures. More specifically, Loy Yang brown coal (raw coal) was pre-heated and dried at room temperature and in the atmosphere, reducing its moisture content to around 20 mass %; the resultant coal was placed in a horizontally installed tubular furnace with $N_2$ gas circulating therethrough; in this state, the in-furnace temperature was raised to 400° C., 600° C., 700° C., and 800° C., and the inherent moisture, volatile content, ash, fixed carbon yield (%), and the fuel ratio at that time were measured.

As shown in FIG. 7 and (Table 5), in the coal processed at 400° C., the fuel ratio was 2.5, thus showing that there has been realized a fuel ratio on the order of bituminous coal like Newlands coal.

TABLE 5

| | Processing temperature (° C.) | | | | |
|---|---|---|---|---|---|
| | 400 | 600 | 700 | 800 | Newlands coal |
| Inherent moisture (mass %) | 6.3 | 8.4 | 10.3 | 14.6 | 2.7 |
| Volatile content (mass %) | 26.3 | 13.0 | 10.2 | 7.3 | 27.3 |
| Ash (mass %) | 2.5 | 3.3 | 3.6 | 3.7 | 14.7 |
| Fixed carbon (mass %) | 64.8 | 75.3 | 76.0 | 74.4 | 55.3 |
| Fuel ratio | 2.5 | 5.8 | 7.5 | 10.2 | 2 |

Experiment Example 5

Drying Temperature Effect Test

In experiment example 5, the drying temperature was examined.

Figure 8:
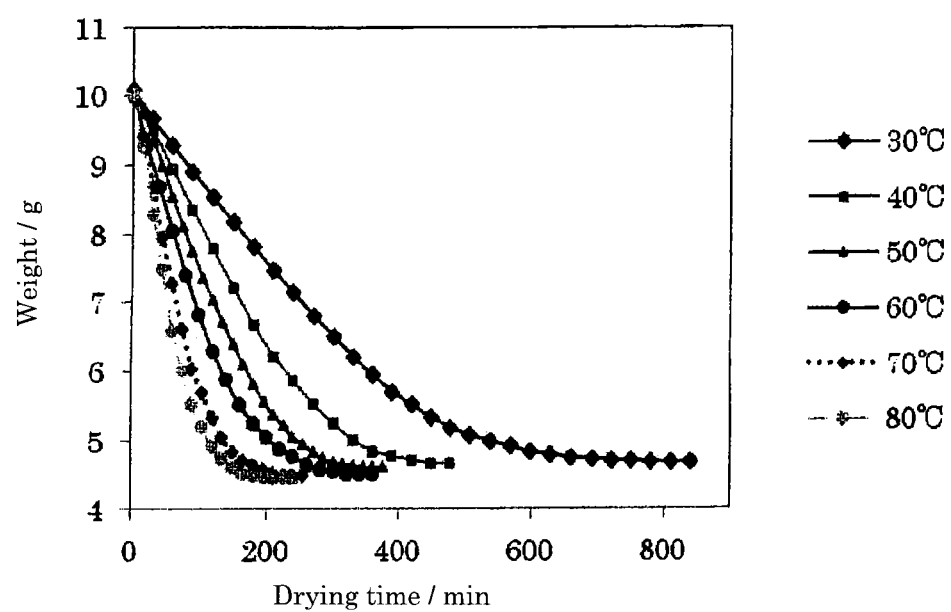
FIG. 8 is a graph illustrating the moisture content in terms of temperature and time in the case of low temperature drying.

FIG. 8 and (Table 6) are graphs illustrating the moisture content in low temperature drying according to temperature and time.

As the specimen, there was employed Loy Yang brown coal (raw coal); the time and the weight of each specimen when the humidity was set to 40% were measured, using the temperatures in a thermo-hygrostat (IW 222 manufactured by Yamato Scientific Co., Ltd.) as the respective measurement conditions.

As shown in FIG. 8 and (Table 6), it is understood that the requisite time is greatly reduced for drying at 30° C. and for drying at 40° C. When the temperature is increased, the drying time is shortened; however, as compared with the room temperature condition, the ratio at which the drying time is shortened is higher when the temperature is around 30° C., which is somewhat higher than room temperature. Thus, when the drying temperature is high, the advantage attained is rather small as compared with the heat value consumed in order to raise the temperature. (The degree by which the drying time is shortened is reduced.) Thus, by performing drying at about 40° C., the input heat value is minimized, it is possible to perform the drying processing at high efficiency. Further, it is understood from this fact that the temperature range of 30° C. to 50° C. is most preferable. When the temperature is lower than 30° C., the drying time is too long, which undesirably results in an increase in the size of the processing device; when the temperature is 50° C. or more, the temperature difference is too small to use the exhaust heat (60° C. to 90° C.) from the condenser; thus, the equipment/system is increased in size in order to warm the dryer; further, it is necessary to add sub equipment such as a heat pump in order to raise the temperature, which leads to inferior resource-saving efficiency and is not desirable.

TABLE 6

| | | Drying temperature (° C.) | | | |
|---|---|---|---|---|---|
| | | 30 | 40 | 50 | 60 | 70 |
| | | | Time elapsed (min) | | | |
| Moisture in brown coal (%) | 50 | 180 | 120 | 90 | 70 | 45 |
| | 40 | 330 | 210 | 150 | 120 | 90 |
| | 30 | 420 | 270 | 195 | 160 | 120 |
| | 20 | 600 | 360 | 270 | 220 | 150 |

Next, regarding the power generation system according to the present embodiment, the heat balance and the material balance were obtained through computer simulation. The condition was as follows: as the low rank coal, there was used unprocessed brown coal produced in Victoria. The initial moisture of the brown coal was 60 mass %, the moisture of dried brown coal after the drying in the drying unit 3 was 20 mass %, the fuel ratio was 1.2, and the power generation efficiency was 30%.

Figure 9:
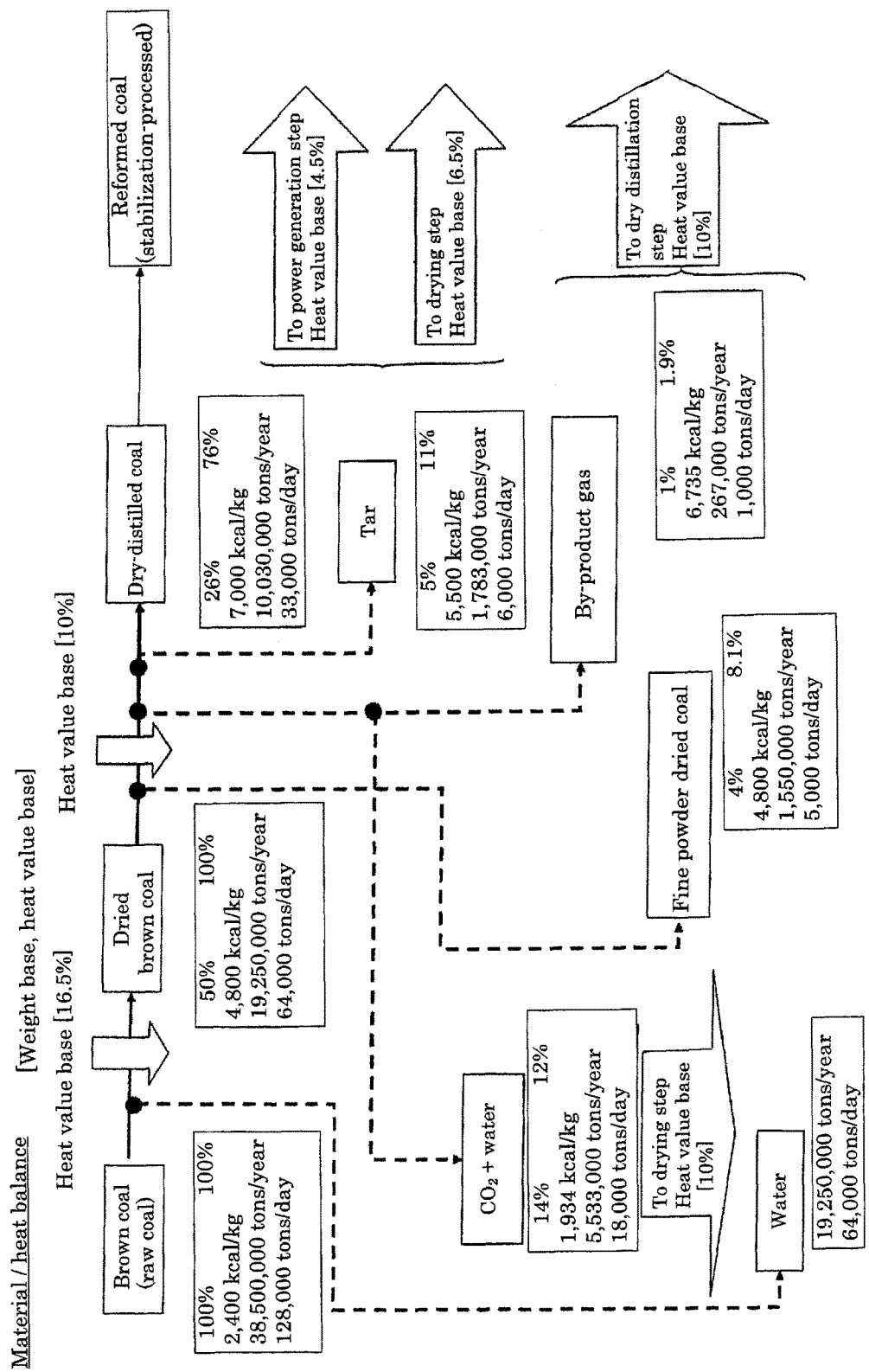
FIG. 9 is a diagram illustrating the heat balance and material balance according to an embodiment.
Figure 10:
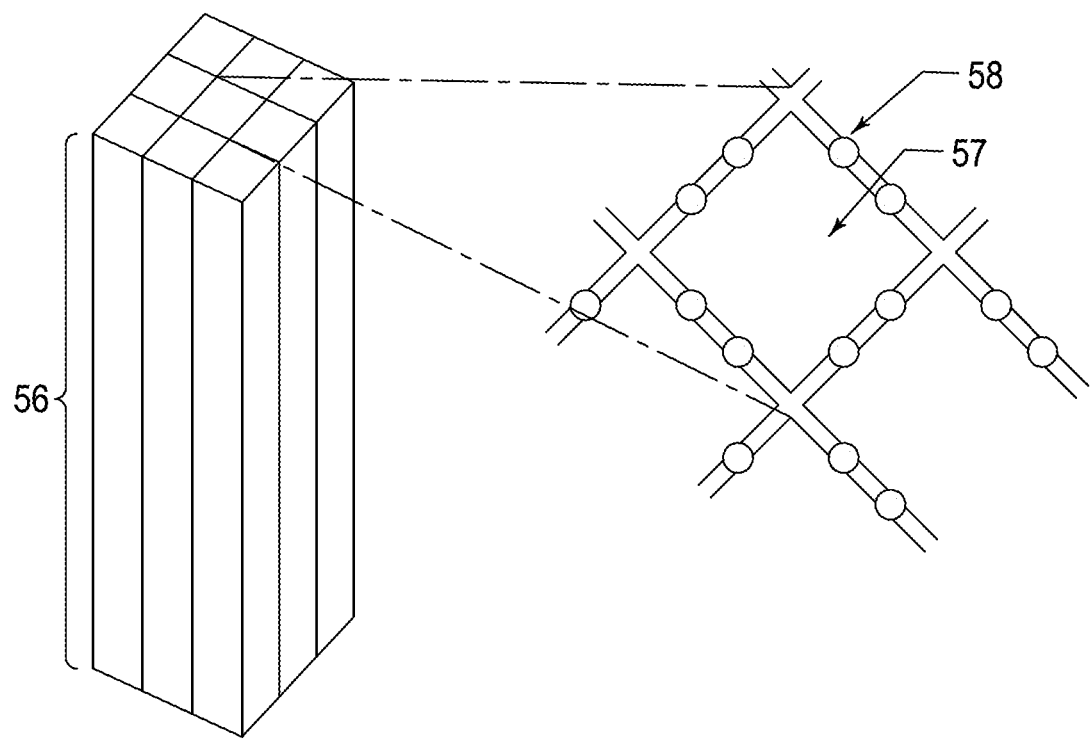
FIG. 10 is a diagram illustrating a dry distillation unit 56 and a dry distillation mini-furnace 57 as described herein. Although one of the dry distillation mini-furnace 57 in the center part of the dry distillation unit 56 is shown as an example, 3 ×3 rows of dry distillation mini furnaces 57 are provide in the dry distillation unit 56 as described herein. In the blow-up at right, the arrangement of the pipe heating means 58 between the adjacent dry distillation mini-furnaces 57 is shown.
Figure 11:
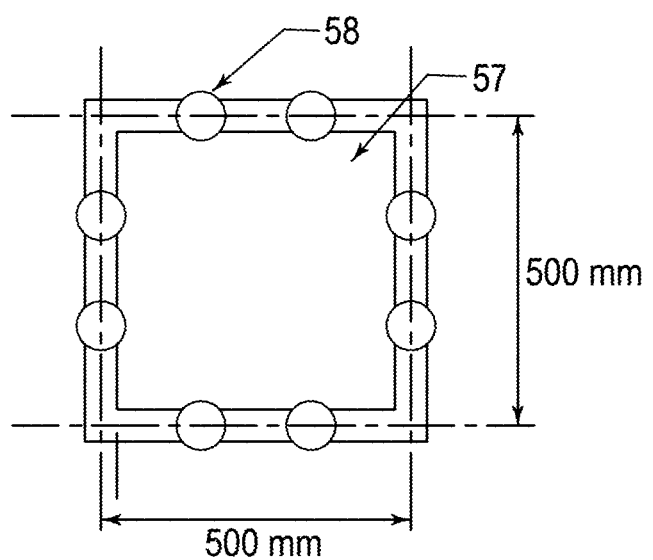
FIG. 11 is a diagram providing an enlarged view of one of the dry distillation mini-furnaces 57 surrounded by the pipe heating means 58 between the adjacent dry distillation mini-furnaces 57. For ease of visualization, the center line is added along with an exemplification of the size for reference.

FIG. 9 shows the experiment results, illustrating the heat balance and the material balance in the present embodiment.

As shown in FIG. 9, the heat value of the raw material brown coal is 2400 kcal/kg, and the heat value of the fixed carbon is 7000 kcal/kg, so that, by performing drying and dry distillation, the heat value per weight is increased by about 2.9 times, thus heat value efficiency is excellent. It is possible to produce a fixed carbon which is solid fuel of about 2.9 times the heat value; further, by vaporizing the moisture and performing dry distillation, it is possible to reduce the weight of the raw material coal, which is 38,500,000 tons, to 26%, which is 10,030,000 tons, which leads to excellent transportability and makes it possible to convey the coal to a place other than the coal-producing region, effectively using the coal as solid fuel.

Further, the present inventors have extensively studied how to effectively utilize low rank coal such as brown coal, finally completed a complex system making it possible to produce char and raw material gas from low rank coal at high efficiency, which was filed as International Application No. PCT/JP2012/056706. In this complex system, fixed carbon is used as the main fuel. In this case, the fixed carbon is fed as the requisite input heat for the drying and dry distillation, so that the requisite energy for generating the fixed carbon itself is lost.

According to the present invention, after further careful study, power generation is performed by using hydrocarbon gas as the main fuel, and fixed carbon is produced, so that it is possible to produce fixed carbon at high efficiency, so that the system is excellent in energy-saving efficiency. The fixed carbon produced allows power generation like high rank coal such as Newlands coal. Further, as compared with the raw material coal, it is possible to reduce the weight of the coal at that time to about ¼ (26%), so that it is possible to convey fixed carbon at about four times the amount by a similar means; thus, the system is excellent in energy-saving efficiency and transportability, making it possible to use the coal at a power generation plant, etc., near the place where the power is consumed, i.e., at a place other than the coal-producing region, so that the system is excellent in terms of the utilization of energy.

Further, it is understood from FIG. 9 that the tar component and the by-product gas generated are utilized in terms of heat for the power generation step and the drying step, utilizing the exhaust heat of the condenser of the power generation step; thus, the exhaust heat is utilized by as much as 26.5% by the heat value base for the drying step and the dry distillation step, and by as much as 4.5% by the heat value base for the power generation step, thus building a high efficiency power generation system.

INDUSTRIAL APPLICABILITY

According to the present invention, low rank coal is dried in the drying step, dry distillation is performed in the dry distillation step with the combustion heat of the combustion step while moving the dry distillation furnace; power generation is performed by using the hydrocarbon gas obtained through dry distillation as the main fuel, and, by recycling fixed carbon obtained through dry distillation, it is possible to use the fixed carbon as solid fuel that may be transported overseas. Further, the exhaust heat of the combustion step is supplied to the drying step and the dry distillation step to utilize it for temperature control and to perform the circulation or recycle of $CO_2$ gas and power generation. As a result, power generation and the production of solid fuel are combined to provide a power generation system allowing full use of $CO_2$, electricity, and solid fuel.

REFERENCE SIGNS LIST

1 Power generation system
2 Mining/coal-conveying equipment
3 Dryer
4 Dryer heat exchange unit
5 Dust collector
6 Preprocessing device
7 Preprocessing device heat exchange unit
8 Dried coal bunker
9, 9A Dry distillation furnace
9a Separating wall
9b Partition plate 10 Dry distillation furnace heat exchange unit
11, 11A Cooling bath
12 Cooling bath heat exchange unit
13 Fluidized bed combustor
14 Combustor main steam heat exchange unit
15 Reheated steam heat exchange unit
16 Cyclone
17 Ash processing device
18 Combustion air preheater
19 Combustion air preheater heat exchange unit
20 $CO_2$ separation device
21 Chimney
22 $CO_2$ supply unit
23 CCS
24 Forced draft fan
25 $O_2$ separator
26 $O_2$ supply unit
27 Pre-heated $O_2$ supply unit
28 $N_2$ supply unit
29 Dry air forced draft fan
30 Inert gas preheater
31 Pre-heated $N_2$ supply unit
32 Steam turbine
33 Condenser
34 Power generator
35 Cooling tower
36 Condenser exhaust heat supply unit
37 Steam drive type water supply pump
38 Water supply unit
39 Water supply heater
40 Heated water supply unit
41 Main steam supply unit
42 Reheated steam supply unit
43 Reheated steam return unit
44 Reheated steam dry distillation furnace supply unit
45 Reheated steam preprocessing device supply unit
46 Fixed carbon production device
47 Dry distillation gas piping
48 Dried brown coal feeding device
49 Extraction port for fixed carbon
50 Simulated moving bed indirect heating dry distillation fur
51 Container furnace
51*a* Inert gas feeding port
51*b* Inert gas outlet
52 Electric furnace
53 Motor
54 Moving direction of container furnace
55 Fixed carbon
56 Dry distillation unit
57 Dry distillation mini-furnace
58 Pipe heating means

The invention claimed is:

1. A power generation system comprising:
(A) a fixed carbon production device for producing fixed carbon and hydrocarbon gas by dry-distilling and cooling low rank coal;
(B) a power generator for combusting the hydrocarbon gas as a main fuel, thereby generating main steam and moving a steam turbine by the main steam and a condenser; and
(C) a heat supply unit using exhaust heat from the condenser for heating of inert gas in drying; wherein
(D) the fixed carbon production device conducts the dry-distilling and the cooling; and wherein the fixed carbon production device is provided with:
a dry distillation furnace for dry-distilling, said dry' distillation furnace being erected in a cooling bath for cooling dry-distilled fixed carbon;
a dry distillation unit which is partitioned into a rectangular or a polygonal shape in a vertical direction on a horizontal cross-section in the dry distillation furnace by a separating wall from an upper portion to a lower portion;
a plurality of dry distillation mini-furnaces which are each partitioned into a rectangular or a polygonal shape in the vertical direction on the horizontal cross-section in the dry distillation unit by a partition plate from an upper portion to a lower portion:
a pipe heating means for heating which is arranged on the separating wall of the dry distillation unit and the partition of each of the dry distillation mini-furnace; and
a collection path for collecting fixed carbon produced in the cooling bath by feeding raw material coal from the upper portion and performing dry distillation in each of the dry distillation mini-furnaces by the pipe beating means.

2. The power generation system according to claim 1, further comprising:
a dryer for drying the low rank coal prior to the dry-distilling.

3. The power generation system according to claim 2, wherein a drying temperature in the dryer is from 30°C to 50° C.

4. The power generation system according to claim 1, wherein a moisture content of the low rank coal in the dry distillation furnace is 20 mass % or less in the drying.

5. The power generation system according to claim 2, wherein a grain size of the low rank coal in the dryer is from 0.1 µm to 5 mm.

6. The power generation system according to claim 1, further comprising:
a heat supply unit supplying exhaust heat generated in the combusting to the dry-distilling by utilizing steam, combustion exhaust gas, or a heat medium heated in the combusting.

* * * * *